United States Patent
Chinoy et al.

(10) Patent No.: US 10,875,721 B1
(45) Date of Patent: *Dec. 29, 2020

(54) CONTROLLING ACCESS TO ITEMS IN AN INVENTORY LOCATION

(71) Applicant: AMAZON TECHNOLOGIES, INC., Seattle, WA (US)

(72) Inventors: Ammar Chinoy, Seattle, WA (US); Jason Michael Famularo, Seattle, WA (US); Amber Autrey Taylor, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,634

(22) Filed: Dec. 2, 2019

Related U.S. Application Data

(63) Continuation of application No. 14/312,148, filed on Jun. 23, 2014, now Pat. No. 10,501,267.

(51) Int. Cl.
*G06K 9/62* (2006.01)
*B65G 43/00* (2006.01)
*G06K 9/00* (2006.01)

(52) U.S. Cl.
CPC .......... *B65G 43/00* (2013.01); *G06K 9/00335* (2013.01); *G06K 9/00771* (2013.01)

(58) Field of Classification Search
CPC .................. G06K 9/00335; G06K 9/00771
See application file for complete search history.

(56) References Cited

U.S. PATENT DOCUMENTS

| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 8,752,870 B2 | 6/2014 | Wolf |

(Continued)

OTHER PUBLICATIONS

Richard P. Kusserow, "Youth and Alcohol: Laws and Enforcement, is the 21-Year-Old Drinking Age a Myth?", Department of Health and Human Services, Office of Inspector General, OEI-09-91-00650, published 1991, 22 pages total. (Year: 1991).*

(Continued)

*Primary Examiner* — Brian Werner
(74) *Attorney, Agent, or Firm* — Lindauer Law, PLLC

(57) ABSTRACT

Access to items stored within an inventory location of a facility may be controlled using physical access control mechanisms. A user within a facility is detected by sensors, such as imaging sensors. Context data for the user is generated based on the sensor data. The context data includes permission data indicative of portions of the inventory location that are accessible or inaccessible to the user. In addition, a predicted path of the user may also be determined based on historical data of the user or other users of the facility. Using the permission data and the predicted path of the user, configuration data may be generated to specify the level of access control to be applied to the different portions of the inventory location. The configuration data is sent to access control mechanisms of the inventory location to prevent or allow access to such portions of the inventory location.

20 Claims, 10 Drawing Sheets

(56) References Cited

U.S. PATENT DOCUMENTS

| | | | |
|---|---|---|---|
| 8,903,119 | B2 | 12/2014 | Dedeoglu et al. |
| 9,235,928 | B2 | 1/2016 | Medioni et al. |
| 10,501,267 | B1* | 12/2019 | Chinoy .............. G06K 9/00771 |
| 2006/0237427 | A1* | 10/2006 | Logan .................... E05B 47/06 |
| | | | 219/401 |
| 2011/0011936 | A1 | 1/2011 | Morandi et al. |
| 2012/0001828 | A1* | 1/2012 | Gallagher .............. G06Q 30/02 |
| | | | 345/1.1 |
| 2012/0284132 | A1 | 11/2012 | Kim et al. |
| 2013/0284806 | A1 | 10/2013 | Margalit |
| 2014/0232120 | A1 | 8/2014 | Wolf |
| 2015/0086107 | A1 | 3/2015 | Dedeoglu et al. |
| 2015/0116109 | A1* | 4/2015 | Fadell .................. G08B 19/005 |
| | | | 340/501 |

OTHER PUBLICATIONS

Asthana, Abhaya, et al., "An Indoor Wireless System for Personalized Shopping Assistance", CiteSeerX, In Proceedings of IEEE Workshop on Mobile Computing Systems and Applications, 1994, 6 pages. Retrieved from the Internet: http://citeseerx.ist.psu.edu/viewdoc/summary?doi=10.1.1.127.3303.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

Werner, Brian P., "Final Office Action dated Dec. 21, 2017", U.S. Appl. No. 14/312,148, The United States Patent and Trademark Office, dated Dec. 21, 2017.

Werner, Brian P., "Final Office Action dated Jul. 8, 2016", U.S. Appl. No. 14/312,148, The United States Patent and Trademark Office, dated Jul. 8, 2016.

Werner, Brian P., "Non-Final Office Action dated Aug. 31, 2017", U.S. Appl. No. 14/312,148, The United States Patent and Trademark Office, dated Aug. 31, 2017.

Werner, Brian P., "Non-final Office Action dated Mar. 3, 2016", U.S. Appl. No. 14/312,148, The United States Patent and Trademark Office, dated Mar. 3, 2016.

Werner, Brian P., "Non-Final Office Action dated Oct. 18, 2016", U.S. Appl. No. 14/312,148, The United States Patent and Trademark Office, dated Oct. 18, 2016.

Werner, Brian P., "Notice of Allowance dated Apr. 11, 2018", U.S. Appl. No. 14/312,148, The United States Patent and Trademark Office, dated Apr. 11, 2018.

Werner, Brian P., "Notice of Allowance dated Dec. 14, 2018", U.S. Appl. No. 14/312,148, The United States Patent and Trademark Office, dated Dec. 14, 2018.

Werner, Brian P., "Notice of Allowance dated Jul. 17, 2019", U.S. Appl. No. 14/312,148, The United States Patent and Trademark Office, dated Jul. 17, 2019.

* cited by examiner

CONTROLLING ACCESS TO ITEMS IN AN INVENTORY LOCATION

PRIORITY

This application is a continuation of, and claims priority to, U.S. patent application Ser. No. 14/312,148, filed on Jun. 23, 2014, entitled "Control of Physical Access To Items In A Facility" which is hereby incorporated by reference in its entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth.

Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, it is picked from its current location and transitioned to a new location. It may be desirable to limit physical access to items to reduce breakage, theft, misplacement of items, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
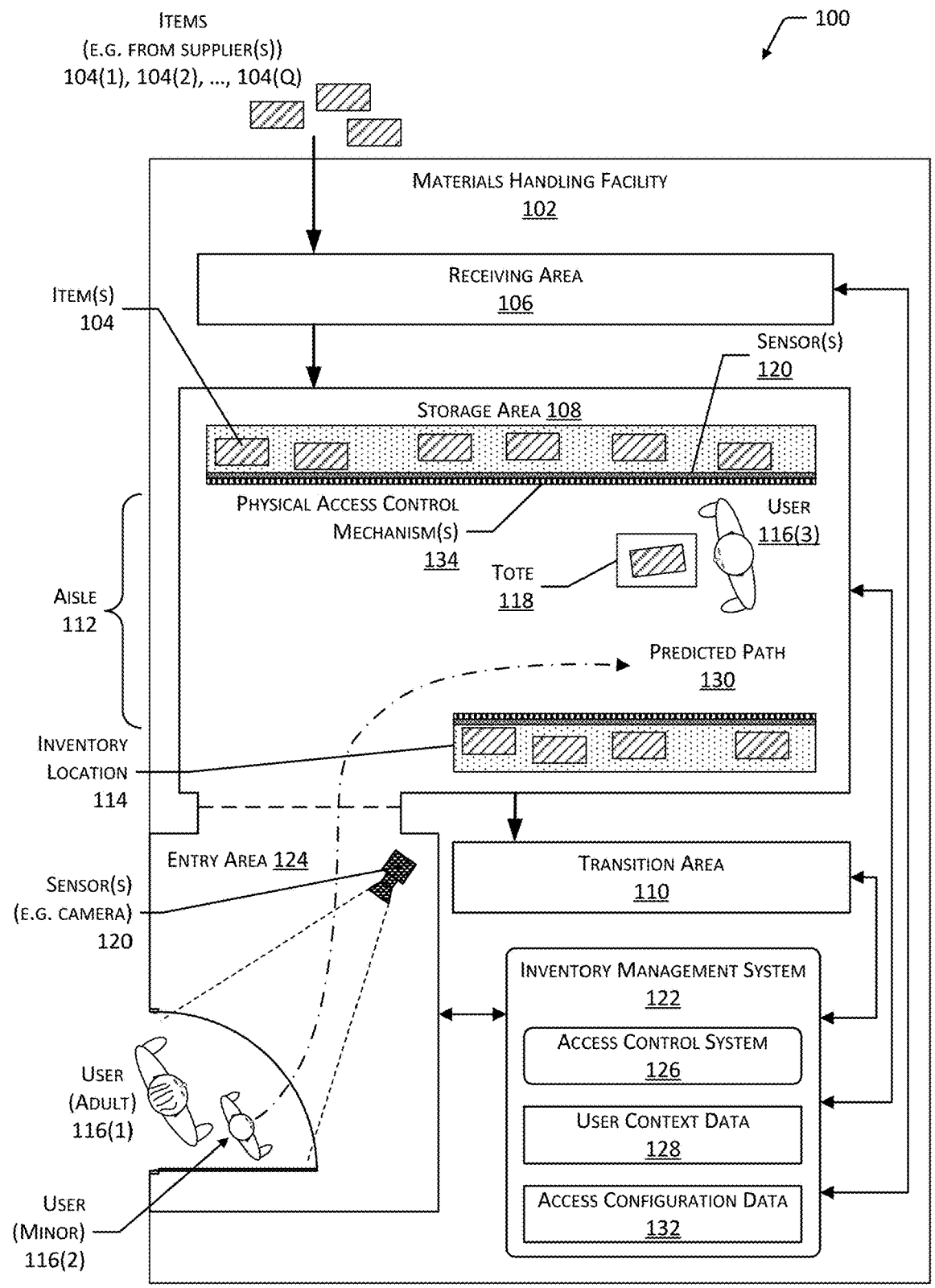
FIG. 1 is a block diagram illustrating a materials handling facility configured to control physical access to items, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for controlling how users may physically access items in a materials handling facility (facility). The facility may include, or have access to, an inventory management system. The inventory management system may be configured to maintain information about items, users, condition of the facility, and so forth. For example, the inventory management system may maintain data indicative of what items a particular user is directed to pick, historical data about items the particular user has picked, predicted paths through the facility to follow while picking, and so forth.

A plurality of sensors may be arranged within the facility and may generate sensor data. The sensors may include imaging sensors, radio frequency identification (RFID) tag readers, weight sensors, and so forth. The sensor data may be processed by the inventory management system to determine information such as identity of a user, location of the user in the facility, age, relationship with other users, and so forth.

The inventory management system may include an access control system. The access control system is configured to determine which users are permitted what level of physical access to one or more of the items stored in inventory locations. The level of physical access afforded to the user may include unrestricted access, partially restricted access, restricted access, and so forth. For example, the unrestricted access may allow the user to take the item from the inventory location, the partially restricted access may maintain the item at the inventory location using a tether. The restricted access may conceal the item from view and prevent the user from handling the item, and so forth. Different users may be subject to different levels of physical access as defined. For example, an adult user may have unrestricted access to items in the inventory locations while a minor user may be permitted partially restricted access or restricted access.

The inventory management system may generate access configuration data which comprises data indicative of the level of physical access which the one or more inventory locations are to be configured. For example, the access configuration data may comprise extensible markup language (XML) data which designates a first inventory location is to be set to prevent physical access while a second inventory location is to be set to allow physical access.

The generation of the access configuration data may be based at least in part on user context data. The user context data may include information about the facility, the items, historical activity data, location of users in the facility, proximity of users in the facility, gaze direction, user data such as demographic data, relationship data, predicted path through the facility, item interaction data, access permissions, and so forth.

The access configuration data may be used to direct operation of one or more physical access control mechanisms. For example, the access configuration data may comprise data indicating the inventory location at aisle 1, rack A, shelf 4 is to be configured to allow physical access. The physical access control mechanisms may comprise one or more devices such as motors, hydraulic actuators, pneumatic actuators, and so forth, which manipulate components such as barriers, shields, doors, gates, and so forth to control the user's ability to physically access (or "handle") items stored by an inventory location. In one implementation the physical access control mechanisms may include barriers such as a door or other member or structure which may be opened or closed to permit or deny access to the items. Continuing the example, the physical access control mechanism may process the access configuration data and open the door to the inventory location at aisle 1, rack A, shelf 4. In another implementation the physical access control mechanism may lock, unlock, or otherwise control a dispenser configured to distribute one or more items.

The inventory management system may acquire, generate, or update the user context data allowing the access control system to control physical access to items in a dynamic fashion. In one example, as a first user (who is an adult) walks through the facility, the physical access control mechanisms are configured to open the inventory locations within a threshold distance of a current location of the first user in the facility. As the first user moves through the facility, the user context data may include a predicted path, anticipating where the first user may be going. The inventory locations along this predicted path may be configured to allow access to the items therein. Thus, as the first user moves through the facility, the inventory locations at hand or ahead open to allow physical access, while the inventory locations behind close to prevent physical access by others.

In another example, a second user (who is a minor) is also present with the first user. The access control system may be configured to provide minors with restricted access, i.e., they are prevented physical access to the inventory locations and the items therein. As the second user approaches the inventory locations, the barriers of the inventory locations close to keep the minor from handling the items stored therein. In some situations, the access permissions may allow unrestricted access to particular inventory locations, such as those containing child-friendly toys such as non-fragile items, those above a threshold height, and so forth.

Access permissions to inventory locations may be delegated, either permanently or temporarily. For example, the first user who is an adult may delegate authority to the second user who is a minor to retrieve a particular item from an inventory location. This delegation may be explicit or implicit. With explicit delegation the first user may provide input by way of a user interface such as entry on a touchscreen, speech input, gestures, handoff of a physical token such as an RFID tag, and so forth. After receiving or otherwise being associated with the credentials associated with delegation, the second user may then be accorded permission to have physical access to one or more of the inventory locations.

Implicit delegation may be based on analysis of user context data, such as information indicative of proximity of the second user to the first user. For example, the access control system may be configured to allow the second user (minor) to have unrestricted physical access to inventory locations so long as the second user is less than one meter away from the first user (adult).

The inventory management system may be configured to identify the user. Identification may comprise associating a user with a particular user account. For example, the identification may involve one or more of facial recognition, entry of one or more login credentials such as the username and password, detection of a tag, receiving data stored within a tag such as an RFID chip, and so forth. Once identified, the user context may also include user data which is specific to a particular identity. For example, the user data may include a username or user identifier, demographic data such as the user's age as determined from previously stored data such as a birthdate, relationship data indicative of a relationship between the identified user and another person such as indicating the second user is a child of the first user, user preferences indicative of preferred distance thresholds, and so forth.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein enable the facility to unobtrusively control physical access to items. Users with access permissions granting access may move through the facility finding inventory locations and the items stowed thereby accessible. Inventory locations for which the user has not been granted access may remain inaccessible, preventing handling of the items at those inventory locations. The access control system may reduce accidental breakage of items, reduce theft, minimize efforts needed to move misplaced items which have been incorrectly stowed, reduce erroneous picks, and so forth. As a result of these or other benefits, overall operation of the facility and the user experience may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), ..., 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, a transition area 110, and an entry area 124.

The receiving area 106 may be configured to accept items 104, such as from suppliers, for intake into the facility 102.

For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, dispensers, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102 such that user access to a particular inventory location 114 such as a bin, shelf, and so forth may be permitted or denied. For example, the inventory location 114 may comprise a rack upon which inventory locations 114 such as bins may be moved vertically to place them within or out of reach of a user.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport. The totes 118 may include carts, baskets, bags, bins, and so forth. The totes 118 are discussed in more detail below with regard to FIG. 4.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, imaging sensors, weight sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices may contain sensors 120 configured to acquire sensor data. Continuing the example, the inventory locations 114 may contain imaging sensors configured to acquire images of pick or placement of items 104 on shelves. The sensors 120 are discussed in more detail below with regard to FIG. 2.

During operation of the facility 102, the sensors 120 may be configured to provide information suitable for tracking how objects move within the facility 102. For example, a series of images acquired by an imaging sensor may indicate removal of an item 104 from a particular inventory location 114 by the user 116 and placement of the item 104 on or at least partially within the tote 118.

While the storage area 108 is depicted as having one or more aisles 112, inventory locations 114 storing the items 104, sensors 120, and so forth, it is understood that the receiving area 106, the transition area 110, the entry area 124, or other areas of the facility 102 may be similarly equipped. Furthermore, the arrangement of the various areas within the facility 102 are depicted functionally rather than schematically. In some implementations, multiple different receiving areas 106, storage areas 108, entry areas 124, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, the transition area 110, or the entry area 124.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at the receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The entry area 124 is configured with one or more sensors 120 to acquire sensor data as the user 116 enters the facility 102. For example, the entry area 124 may include a plurality of imaging sensors 120 such as cameras configured to acquire images of the user 116. The entry area 124 may be located outside of the walls of the facility 102, within the facility 102, or both. For example, the entry area 124 may include sensors 120 which acquire data as the user 116 approaches a door to the facility 102.

The inventory management system 122 may include, or be in communication with, an access control system 126. The access control system 126 is configured to use user context data 128 to generate access configuration data 132. The user context data 128 may include the sensor data, previously stored information, and so forth. For example, the user context data 128 may include a predicted path 130 which indicates possible routes through the facility 102 by a particular user 116. The predicted path 130 may be proximate to one or more of the inventory locations 114. For example, the predicted path 130 may go past the inventory location 114(1), or may have inventory location 114(2) as a destination. The predicted path 130 may be based on information such as the identity of the user 116, items 104 previously acquired by the user 116 at previous visits to the facility 102, and so forth.

The user context data 128 may include information about operation of the facility 102, data about the items 104, the user 116 as an anonymous individual, the user 116 as an identified individual, data external to the facility 102 such as social graphs indicative of relationships between users 116, and so forth. For example, the user context data 128 may include location data indicative of a location of the one or more users 116 within the facility 102, that the user 116(2) is a minor child of the user 116(1), and so forth. The user context data 128 may be obtained or generated from sensor data, external data sources, user input, and so forth. For example, the sensor data acquired by the sensors 120 in the entry area 124 may include images of the user 116(1) and the user 116(2) entering the facility 102 together. The inventory management system 122 may use the images to generate user context data 128 indicating the users 116(1) and 116(2) are related, and to determine the user 116(1) is an adult while the user 116(2) is a minor. For example, the age of the users 116 may be estimated based on height and facial characteristics which may be extracted from the image data. In other implementations, the age of the user 116 may be estimated using other inputs, such as weight, analysis of speech, and so forth. For example, a user's 116 voice which is very deep may be deemed to correspond to at least a minimum age value, such as 16 years.

The access configuration data 132 comprises information indicative of the level of physical access to which the one or more inventory locations 114 are to be configured. The access configuration data 132 may be provided to the physical access control mechanisms 134 which may then respond to the information, thus implementing the level of physical access specified. For example, the access configuration data 132 may indicate that inventory location 114(1) is to be set to restricted physical access. The physical access control mechanisms 134 may process the access configuration data 132 and actuate one or more devices to close barriers, preventing physical access by the user 116 to the items 104 in the inventory location 114.

The inventory management system 122 may provide updated user context data 128 to the access control system 126 for use in generating dynamic access configuration data 132. For example, as the user 116(1) moves through the facility 102, the user context data 128 may be updated to include information such as current location within the facility 102, what inventory locations 114 are within arm's reach of the user 116, proximity of other users 116, updating the predicted path 130, and so forth. The user context data 128 may be specific to an individual user 116, or may be combined across multiple users 116.

The access control system 126 may use different approaches to resolving conflicts between different levels of physical access to particular inventory locations 114 at a particular time. For example, a busy aisle 112 in which the inventory location 114(1) is located may include a first set of users 116 which have access permissions of "unrestricted" and a second set of users 116 which have access permissions of "unrestricted". In this situation, the access control system 126 may be configured to generate access configuration data 132 to actuate the physical access control mechanisms 134 to place the inventory locations 114 into the unrestricted state. Thus, the first and second sets of users 116 are able to access the items 104 in the inventory location 114(1). In other situations, the access control system 126 may default to a most restricted state, preventing access to the first and second sets of users 116, and not removing the physical barriers to access until the second set of users 116 have moved beyond a threshold distance from the particular inventory location 114. In yet another situation where the inventory location 114 comprises a dispenser or other device configured to release particular quantities of the items 104, the physical access may remain restricted until the user 116 having access permission to that item 104 reaches toward the dispenser, activates the dispenser, and so forth.

The user 116, facility operator, suppliers, and other parties may benefit from various actions taken by the inventory management system 122 to control physical access to the inventory locations 114 and the items 104 therein. For example, by restricting the physical access of the minor user 116(2) to inventory locations 114, inadvertent picking is avoided. Inadvertent damage to items 104 may also be reduced, increasing the stock available for picking. For example, physical access to items 104 which are determined to be very fragile may be restricted to particular age groups, particular users 116, and so forth. Legal or social requirements may also be enforced by controlling the physical access to inventory locations 114. For example, the user 116 may be prohibited from accessing items 104 which have particular legal requirements to acquire, such as particular types of medications, alcohol, tobacco, and so forth, which are restricted by age.

Furthermore, the control of physical access to items 104 may be accomplished automatically and without intervention of an agent of the facility 102. As a result, the user 116 may more quickly access the items 104 they have access permissions for, and operating costs associated with maintaining the agent at the facility 102 may be reduced or eliminated.

Figure 2:
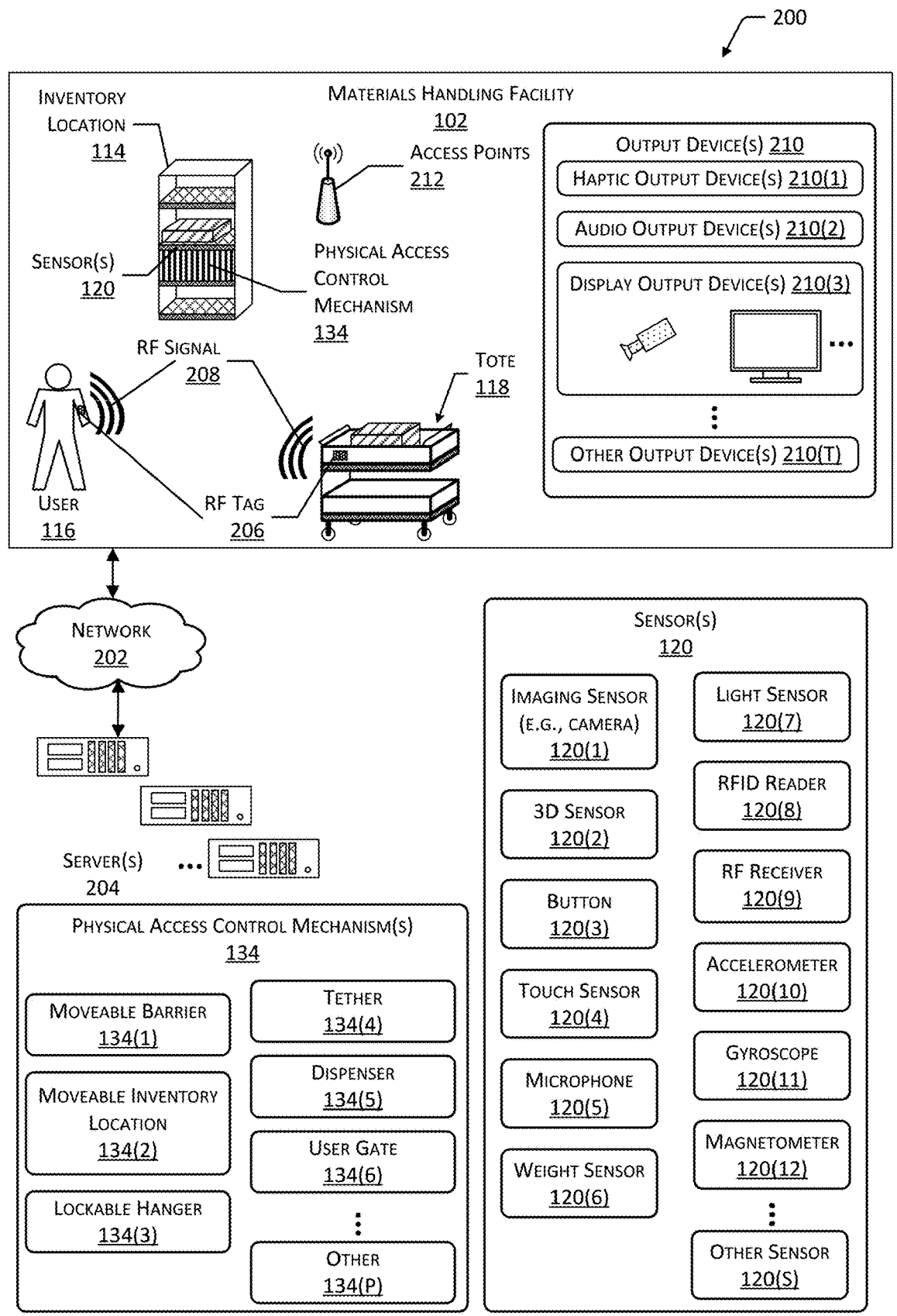
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a location of the object, and so forth. For example, the users 116 may wear RF tags 206, the totes 118 may have RF tags 206 affixed, and so forth which may be read and be used to determine identity and location. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects and determine one or more of a location, orientation, or position of an object. For example, the user context data 128 may include one or more of a location, orientation, or position of the user 116 in three-dimensional space within the facility 102. Location is where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the user 116 has their arms stretched out to either side.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the inventory location 114 may be configured with a button 120(3) such that the button 120(3) may be activated by the user 116 to confirm that the inventory location 114 is to be opened for the user 116.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, delegate access permissions, and so forth.

One or more microphones 120(5) may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, and so forth. For example, the weight sensors 120(6) may provide a weight of a user 116 which may be used, at least in part, to estimate an age of the user 116.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One or more radio frequency identification (RFID) readers 120(8), near field communication (NFC) systems, and so forth may also be provided in the sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth may be determined using the accelerometers 120(10).

A gyroscope 120(11) provides information indicative of rotation of an object affixed thereto. For example, the tote 118 or other objects or devices may be equipped with a gyroscope 120(11) to provide user context data 128 indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

The sensors 120 may include other sensors 120(S) as well. For example, the other sensors 120(S) may include proximity sensors, ultrasonic rangefinders, thermometers, barometric sensors, hygrometers, or biometric input devices including, but not limited to, fingerprint readers or palm scanners.

The facility 102 may include one or more access points 212 configured to establish one or more wireless networks. The access points 212 may use Wi-Fi, near field communication (NFC), Bluetooth, or other technologies to establish wireless communications between a device and the network 202. The wireless networks allow the devices to communicate with one or more of the inventory management system 122, the sensors 120, the RF tag 206, a communication device of the tote 118, or other devices.

The output devices 210 may also be provided in the facility 102. The output devices 210 are configured to generate signals which may be perceived by the user 116.

Haptic output devices 210(1) are configured to provide a signal which results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal which produces an apparent tactile sensation in one or more fingers of the user 116. In another example, the haptic output devices 210(1) may comprise piezoelectric or rotary motor devices configured to provide a vibration which may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to: voice coils, piezoelectric elements, magnetostrictive elements, electrostatic elements, and so forth. For example, a piezoelectric buzzer or a speaker may be used to provide acoustic output.

The display output devices 210(3) may be configured to provide output which may be seen by the user 116, or detected by a light-sensitive detector such as an imaging sensor 120(1) or light sensor 120(7). The output may be monochrome or color. The display output devices 210(3) may be emissive, reflective, or both. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic light emitting diodes (LED), electrophoretic displays, image projectors, or other display mechanisms. The other display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels, or a vector representation of an at least two-dimensional image.

In some implementations, the display output devices 210(3) may be configured to provide non-image data, such as text characters, colors, and so forth. For example, a segmented electrophoretic display, segmented LED, and so forth may be used to present information such as a SKU number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present. The other output devices 210(T) may include lights, scent/odor dispensers, document printers, three-dimensional printers or fabrication equipment, and so forth. For example, the other output devices 210(T) may include lights which are located on the inventory locations 114, the totes 118, and so forth.

The inventory management system 122 may generate the user interface data which is then used by the output device 210 to present a user interface. The user interface may be configured to stimulate one or more senses of the user 116. For example, the user interface may comprise visual, audible, and haptic output.

The facility 102 also includes the physical access control mechanisms 134. The mechanisms may include moveable barriers 134(1), moveable inventory locations 134(2), lockable hangers 134(3), tethers 134(4), dispensers 134(5), user gates or doors 134(6), or other 134(P) mechanisms. The physical access control mechanisms 134 are responsive to the access configuration data 132 and may be actuated through two or more states which provide different levels of physical access to the items 104 at the inventory location 114.

The moveable barriers 134(1) may include a rigid material such as a member made of plastic or metal, fabric or flexible materials such as cloth, and so forth. For example, the moveable barrier 134(1) may comprise an arm which prevents an item 104 from being removed from an inventory location 114. In another example, the moveable barrier 134(1) may comprise a panel or door which, when closed, prevents the user 116 from handling the item 104.

The moveable inventory location 134(2) may comprise mechanisms configured to move, such as by rotation, translation, and so forth, inventory locations 114 from a first location to a second location. For example, the moveable inventory locations 134(2) may comprise a plurality of bins which may be rotated in a carousel fashion to present a particular bin to the user 116, or move a particular bin away from the user 116. In another example, the moveable inventory locations 134(2) may be configured to change height relative to the floor of the facility 102. For example, the shelf may be configured to move from 1 meter above the floor to 2 meters above the floor. By moving, the particular inventory locations 114 may be placed within reach, or outside of reach.

The lockable hangers 134(3) may comprise pegs or other members from which the item 104 may hang or be affixed to. The lockable hangers 134(3) may be configured to allow handling of the item 104 affixed thereto, while preventing unauthorized removal.

The tethers 134(4) may comprise a member such as an arm, cable, ribbon, and so forth which attaches the item 104 to an anchor point or another object. For example, the tether 134(4) may comprise a metal cable which attaches the item 104 to an anchor point bolted to the inventory location 114.

The dispensers 134(5) may include devices configured to hold items 104 and selectively control their distribution. For example, the dispenser 134(5) may comprise a helical member or auger which, when rotated, ejects an item 104.

The physical access control mechanisms 134 may include materials which are opaque, transparent, and so forth. In some implementations, the materials may be controllable, such that their transparency or opacity may be varied. For example, the moveable barriers 134(1) or the moveable inventory locations 134(2) may have one or more portions comprising a device which can be adjusted to provide different levels of transparency or opacity. The device may comprise suspended particle devices, electrochromic devices, polymer dispersed liquid crystal devices, microblinds, nanocrystals, and so forth. For example, the moveable barrier 134(1) may comprise a transparent plastic substrate to which a nanocrystal layer has been applied. Upon application of voltage, the nanocrystal layer may change between states such as opaque to visible light or transparent to visible light. In one implementation, the material may be deemed opaque when transmittance through the material by one or more visible light wavelengths is less than 10%.

By controlling what the user 116 sees, the effectiveness of the physical access control mechanism(s) 134 may be improved. For example, by configuring the moveable barriers 134(1) to an opaque or very dark state such that the user 116 cannot make out the items 104 in the inventory location 114, the user 116 may be less likely to tamper with an inventory location 114 for which they lack access permissions. Said another way, out of sight, out of mind.

The access control system 126 may be configured to vary the opacity or transparency based at least in part on the location of the user 116. For example, when the user 116 is determined to be at a first location which is greater than a threshold distance, the material of the movable barrier 134(1) may be configured to an opaque state. Continuing the example, when the user 116 is determined to be at a second location which is less than or equal to the threshold distance, the material of the movable barrier 134(1) may be configured to an at least partially transparent state. Thus, as the user 116 approaches the inventory location 114 they are able to see the items 104. In some implementations, the opacity or transparency may be modified based upon the proximity of other users 116. For example, to conceal the items 104 in the inventory location 114 from disclosure, the material may remain opaque even though the user 116(1) is less than or equal to the threshold distance because another user 116(2) is also within the threshold distance of the inventory location 114.

The user gate 134(6), a door, turnstile, and so forth may be used to control physical access of the user 116 to a particular area of the facility 102 and the inventory locations 114 and items 104 therein. For example, the user gate 134(6) may limit which users 116 are able to enter a portion of the facility 102 which stores tobacco products.

Other physical access control mechanisms 134 may also be used. For example, the items 104 (or their packaging) may include a member which may mechanically engage a corresponding member at the inventory location 114. In some implementations, a plurality of physical access control mechanisms 134 may be combined. For example, access to high value or dangerous items 104 may be controlled by a user gate 134(6) into the aisle 112, while the inventory locations 114 therein may incorporate moveable barriers 134(1), behind which may be located dispensers 134(5).

Figure 3:
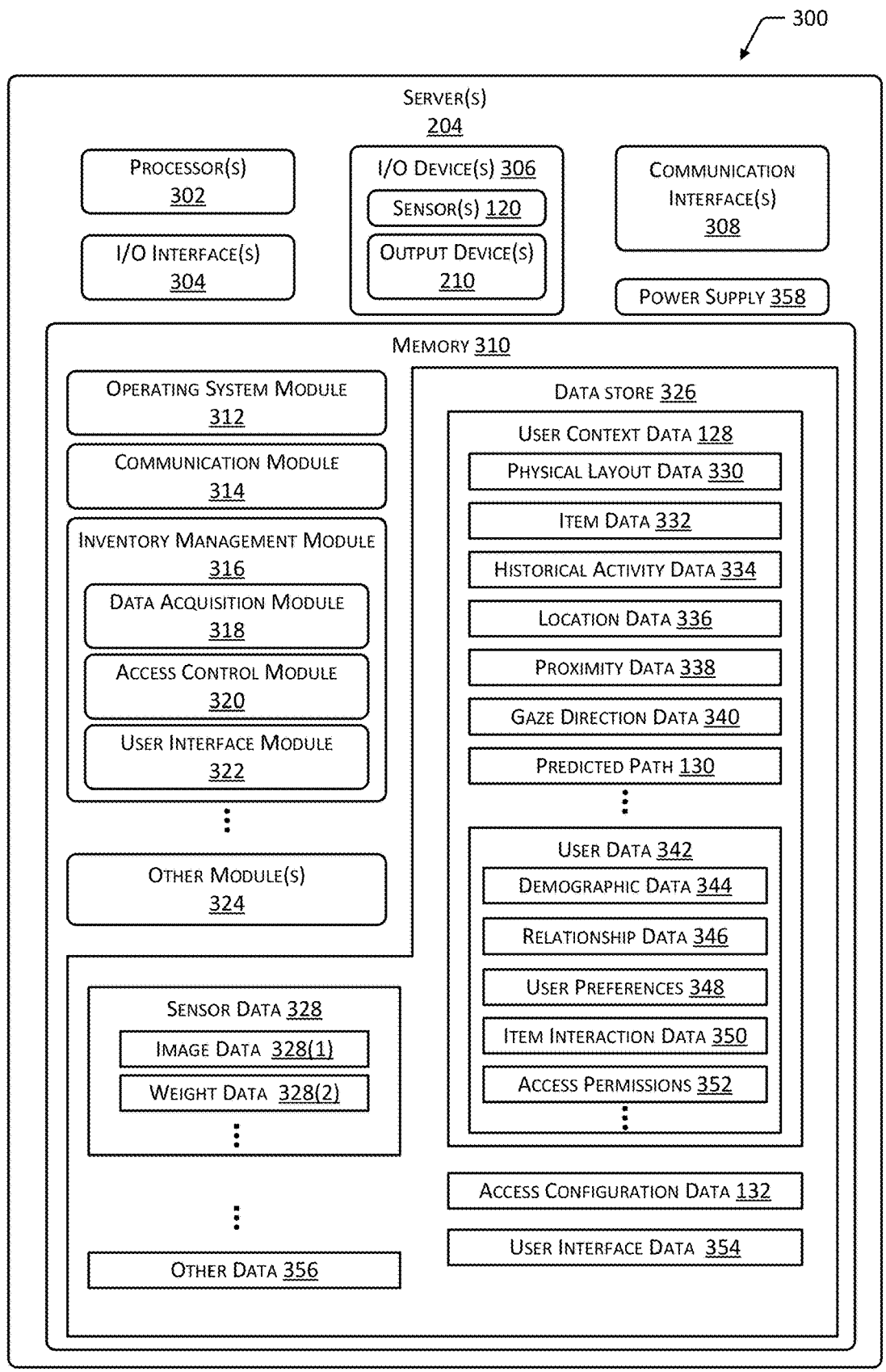
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, the sensors 120, and so forth. The I/O devices 306 may also include output devices 210 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 212, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth. The inventory management module 316 may include one or more of a data acquisition module 318, an access control module 320, or a user interface module 322.

The data acquisition module 318 is configured to acquire input from one or more of the sensors 120. For example, the data acquisition module 318 may be configured to receive images from the imaging sensors 120(1) and audio data generated by the microphones 120(5).

In some implementations, the data acquisition module 318 may analyze the sensor data to generate user context data 128. For example, the data acquisition module 318 may process the sensor data to determine a height of the user 116, determine one or more facial characteristics of the user 116, determine a weight of the user 116, and so forth. The data acquisition module 318 may process one or more of the height, facial characteristics, weight, and so forth, to determine an approximate age of the user 116. Previously stored data that associates height, facial characteristics, weight, or combinations thereof with particular estimated ages may be accessed. For example, a data structure containing previously stored facial characteristics, such as a ratio of distance between the eyes and the mouth of a person, shape of the head, and so forth, may be associated with particular ages or developmental periods such as child, adolescent, adult, and so forth.

Image based estimation of age may include the use of one or more classifiers. These classifiers may classify the image of the user 116 such as "youth" or "adult", "male" or "female", and so forth. Once classified, facial characteristics of the user 116 may be compared to previously stored values to determine an estimated age.

In some implementations, several techniques to estimate age may be combined. For example, estimated ages based on height, facial characteristics, vocal characteristics, and so forth, may be combined to provide an estimated age of the user 116. In one implementation, the estimated ages from different techniques may be combined using various mathematical functions or operations. For example, an average of the estimated ages may be determined. In another example, a weighted average assigning different weights to the estimated age from each technique may be determined.

The data acquisition module 318 may also be configured to generate the predicted path 130 of the user 116. The predicted path 130 may be proximate to one or more inventory locations 114, may begin at an inventory location 114, may end at an inventory location 114, and so forth. The predicted path 130 may be expressed as data of different levels of specificity or granularity. For example, the predicted path 130 may be indicative of coordinates within the facility, inventory locations 114, aisles 112, and so forth. Different data structures may be used to store the predicted path 130, including linked lists, trees, images, and so forth. For example, the predicted path 130 may lead the user 116 down the aisle 112 and past several inventory locations 114. The predicted path 130 may comprise data which is representative of a potential physical path which may be followed by the user 116 through the facility 102.

In some implementations, the predicted path 130 may be based on the user context data 128. The predicted path 130 may take into account the physical layout of the facility 102, the current location of the user 116, current direction of motion of the user 116, previous movement of the user 116 within the facility 102, movement of other users 116 within the facility 102, and so forth. For example, the inventory management module 316 may provide historical activity data indicative of how other users 116 have moved through the facility 102. Based at least in part on this information, the data acquisition module 318 may generate a predicted path 130. In some implementations, a plurality of predicted paths 130 may be determined for a particular user 116, multiple users 116, or group of users 116(U). These different predicted paths 130 may be assigned different probability values. In some implementations, the predicted path 130 may include user data which is specific to a particular identity. For example, the predicted path 130 may include information such as the previous picks of prior visits made by the same user 116, information about that user's 116 preferred paths through the facility 102, and so forth.

The access control module 320 is configured to access the user context data 128 and generate access configuration data 132 which may be used to control the physical access control mechanisms 134 at one or more inventory locations 114. The access control module 320 may be configured to generate or update user context data 128 as the user 116 moves about the facility 102.

The access control module 320 may send the access configuration data 132 to one or more of the physical access control mechanisms 134. Physical access control mechanisms 134 may respond to the access configuration data 132 by assuming a particular physical state, such as allowing or preventing physical access to one or more items 104.

The user interface module 322 is configured to generate user interface data. The user interface data may include one or more controls with which the user 116 may provide input to the access control module 320. For example, the user interface data may be configured to provide a user interface which accepts input from the user 116 to control access permissions. For example, the user 116 may request access permissions, delegate access permissions to another user 116, or remove access permissions.

The user interface data is configured to provide a user interface by way of one or more output devices 210. The user interface may include one or more of haptic, audible, or visual stimuli.

Other modules 324 may also be present in the memory 310. For example, an object recognition module may be configured to use data from one or more of the sensors 120 to identify an object such as the item 104, the user 116, the tote 118, and so forth.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices, and so forth.

The data store 326 may also include sensor data 328. The sensor data 328 comprises information acquired from, or based on, the one or more sensors 120. As described above, the sensors 120 may include an imaging sensor 120(1) which is configured to acquire one or more images. These images may be stored as image data 328(1). The image data 328(1) may comprise information descriptive of a plurality of picture elements or pixels. The weight sensors 120(6) are configured to acquire weight data 328(2) which is representative of the weight of objects within the facility 102. Other sensor data such as audio data from the one or more microphones 120(5), and so forth may also be stored.

The data store 326 may also store the user context data 128. In some implementations, a portion of the user context data 128 may be retrieved from other data stores or devices. The user context data 128 is configured to provide information about one or more of: operation of the facility 102, data about the items 104, the user 116 as an anonymous individual, the user 116 as an identified individual, data external to the facility 102 such as social graph information, and so forth.

The user context data 128 may include physical layout data 330. The physical layout data 330 provides a mapping of physical locations within the physical layout of devices and objects such as the sensors 120, inventory locations 114, and so forth. For example, the physical layout data 330 may indicate the coordinates within the facility 102 of an inventory location 114, an RFID reader 120(8) close to that inventory location 114, and so forth. In some implementations, the inventory management module 316 may access the physical layout data 330 to determine a distance between two objects, such as the users 116(1) and 116(2), between the user 116 and an inventory location 114, and so forth.

Item data 332 may also be included in the user context data 128. The item data 332 may comprise information associated with the items 104. The information may include one or more inventory locations 114, at which one or more of the items 104 are stored. The item data 332 may also include order data, SKU or other product identifier, price, quantity on hand, weight, expiration date, images of the item, detail description information, ratings, ranking, and so forth. The inventory management module 316 may store information associated with inventory management functions in the item data 332.

The user context data 128 may also include historical activity data 334, location data 336, proximity data 338, or gaze direction data 340. The historical activity data 334 provides information about the user interactions with the facility 102 and the objects therein, such as the items 104, the inventory locations 114, other users 116, the totes 118, and so forth. For example, the historical activity data 334 may indicate a time of entry to the facility 102, a route taken while in the facility 102, a list of items 104 which have been picked or placed, and so forth. The historical activity data 334 may be associated with the user 116 which has been identified or is unidentified. In some implementations, the historical activity data 334 may be retrieved, such as in the circumstance of an identified user 116. For example, the user 116 may be identified upon entry to the facility 102. After identification, historical activity data 334 associated with a user account of the user 116 may be retrieved from the data store 326. The data acquisition module 318 may use the historical activity data 334 to generate the predicted path 130.

The location data 336 comprises information indicative of the user's 116 location in the facility 102. The location data 336 may be expressed in absolute terms or relative terms. Absolute terms may comprise a latitude, longitude, and altitude with respect to a geodetic reference point. Relative terms may include a location of 25.4 m along an x-axis and 75.2 m along a y-axis as designated by a floor plan of the facility 102, 5.2 m from an inventory location 114 along the heading of 169, and so forth. The location data 336 may be used to determine user context data 128. For example, based on the location data 336 in the facility 102, and using the information about inventory locations 114 and the corresponding items 104 therein, the access control module 320 may determine the user context data 128 includes the items 104 which are nearby. In some implementations, certain portions of the facility 102 may be blacked out such that location data 336 is not collected. For example, movements within a break room or a restroom are not tracked.

The proximity data 338 provides information which is indicative of a spatial arrangement between the user 116 and another person. For example, the proximity data 338 may indicate that the user 116(1) is within a threshold distance of the user 116(2). In some implementations, the threshold distances may be specified for individual users 116. The threshold distances may be static or dynamically adjusted. For example, the threshold distance may be configured to 3 m from users 116 which are unrelated, and 1 m from the users 116 which have a familial relationship. The access control module 320 may use the proximity data 338 to generate the access configuration data 132. For example, the user 116(1) may have access permissions allowing access to an item 104, while the user 116(2) has access permissions denying access to the item 104. Based at least in part on the proximity data 338 indicating that the user 116(2) is within a threshold distance of the user 116(1), the access configuration data 132 may be configured to allow physical access to the inventory location storing the item 104.

The gaze direction data 340 provides information indicative of a direction the user 116 is looking. In some implementations, the gaze direction data 340 may be determined by processing the image data 328(1) of one or more eyes of the user 116. Based at least in part on the location data 336 of the user 116 and the gaze direction data 340, it may be determined what object the user 116 is looking at. By using this information, the access control module 320 may be able to determine when the user 116 is attempting to pick or place an item 104 at an inventory location. For example, two users 116(3) and 116(4) may be present next to an inventory location 114 for which user 116(3) is allowed physical access and user 116(4) is denied physical access. The access configuration data 132 may be provided to the corresponding physical access control mechanism 134 such that the movable barrier 134(1) remains closed while both are standing near the inventory location, but opens as the user 116(3) looks at the item 104 at the inventory location 114, turns towards the inventory location 114, and so forth.

In other implementations, other directional data or orientation associated with the user 116 may be determined. For example, the directional data may indicate overall orientation of the user's 116 body, the direction of their head, and so forth.

The user context data 128 may also include the predicted path 130. The predicted path 130 may indicate one or more possible routes through the facility 102 to be taken by the user 116. The user 116 may be anonymous or identified. In some implementations, the predicted path 130 may also comprise a time series indicating estimated locations within the facility 102 at particular times. For example, the predicted path 130 may be based on the historical navigation path data of one or more users 116. Continuing the example, the historical navigation path data may indicate that a significant percentage of the users 116 that have gone past a particular aisle 112, enter that aisle 112 even when no items 104 within the aisle 112 are scheduled for picking. In this example, the predicted path 130 for a particular user 116 may include the assumption that this particular user 116 will also enter that aisle 112.

The predicted path 130 may be based on information acquired from the actions of other users 116, the historical activity data 334, and so forth. For example, an anonymous user 116 entering the facility 102 may have a predicted path 130 which reflects the routes taken within the facility 102 by other users 116. In comparison, an identified user 116, for which richer user context data 128 is available may have a different or more specific predicted path 130. The predicted path 130 may also be based at least in part on the presence of other users 116 at one or more locations within the facility 102. For example, at appearance at the entry area 124, the adult user 116(1) and the minor user 116(2) may have a predicted path 130(1) which differs from an adult user 116(5) who is unaccompanied.

The user context data 128 may also include user data 342. The user data 342 comprises information which is specific to an identified user 116. For example, the user data 342 may include a username, legal or "real" name, user identifier, account number, and so forth. The user data 342 may be acquired from a user 116 during a registration process. For example, at initial use of the facility 102, an image of the user 116, information such as the user's name, account name, preferences, and so forth may be acquired. Facial characteristics and other information may be derived from the image of the user 116. Continuing the example, the user 116 may use a kiosk to provide the image and the information.

Once the user 116 has been identified, the user data 342 associated with that identity may be retrieved. For example, facial recognition techniques may be used to determine the identity of the user 116, and the user data 342 may be retrieved. The user data 342 may include demographic data 344, relationship data 346, user preferences 348, item interaction data 350, access permissions 352, or other information.

In some implementations, anonymous users 116 may still be distinguishable from other anonymous users in the facility 102. Thus, the user 116 which is identified may be associated with a particular user account, while an anonymous user 116 may be differentiated from another user 116, even while the identities are unknown.

The demographic data 344 may comprise information indicative of the user's 116 skills, address, contact information, age, weight, height, facial characteristics, biometric information, and so forth. The relationship data 346 provides information indicative of an association between the user 116 and other users 116(U) or people. For example, the relationship data 346 may indicate the users 116(1) and 116(2) are father and son, respectively. The access control module 320 may use the relationship data 346 to generate the access configuration data 132.

The user preferences 348 may include information such as preferred distance thresholds, access permissions, delegations given or received, and so forth. For example, the user preferences 348 may include threshold distance data indicating that the user 116(1) prefers to have allowed physical access to inventory locations 114 which are within 2 m of the user 116(1). The thresholds may be modified based on the physical layout data 330. For example, the threshold distance may be within a "line of sight", such as between the user 116 and inventory locations 114 which are within the same aisle 112.

The item interaction data 350 comprises information about how the user 116 has interacted with one or more items 104. The interaction may include information about how the user 116 has handled the item. Handling may include, but is not limited to one or more of: touching, moving, manipulating, activating, or inspecting the item 104. For example, the item interaction data 350 may indicate the user 116(2) picked up the item 104(3) "Truckasaurus" from the inventory location 114(3) and held the item 104(3) for 120 seconds until setting the item 104(3) onto the floor of the facility 102, and moving away. In another example, the item interaction data 350 may indicate that the user 116(2) damaged the item 104(3) such as by opening the packaging, dropping the item 104(3), and so forth.

The access permissions 352 comprise information indicative of what level of physical access to items 104 or inventory locations 114 is permitted or denied to a particular user 116, group of users 116, category of users 116, and so forth. For example, the access permissions 352 may specify that a category of users 116 with ages greater than or equal to 21 years is permitted access to inventory locations 114 which store tobacco products. An individual user 116, an administrator, or other party may define the access permissions 352.

Different access permissions 352 may be associated with a particular user 116 at different times. For example, a first set of access permissions 352(1) may grant the user 116 rights to physically access all items 104 in the facility 102. Over time, the access permissions 352 for the user 116 may change. Continuing the example, after an evaluation of the item interaction data 350 which indicates that the user 116 has damaged items 104 with a total value exceeding a threshold level, the access control module 320 may associate a second set of access permissions 352(2) with the user 116. The second set of access permissions 352(2) may be more restrictive and deny the user 116 rights to access some items 104 in the facility 102, such as high-value items 104.

The access control module 320 may use the access permissions 352 to generate the access configuration data 132. For example, the access control module 320 may evaluate the user context data 128 such as the location data 336 and the predicted path 130, to determine which inventory locations 114 are within reach of the user 116, or will be in the future. The access permissions 352 may be assessed to determine what level of physical access is to be afforded to the user 116. Based on this assessment, the access control module 320 may generate access configuration data 132 which is indicative of the level of physical access to be provided.

Individual users 116 or groups of users 116 may selectively provide user data 342 for use by the inventory management system 122, may authorize collection of the user data 342 during use of the facility 102, or may authorize access to user data 342 obtained from other systems. For example, a user 116 may opt-in to collection of the user data 342 to receive enhanced services while using the facility 102.

The access configuration data 132 may also be stored in the data store 326. The access configuration data 132 comprises information indicative of the level of physical access which the one or more inventory locations 114 are to be configured, and may also include information indicative of a particular physical access control mechanism 134. For example, the access configuration data 132 may comprise an XML object which indicates the inventory location 114(7) is to be configured to provide unrestricted physical access. In some implementations, the access configuration data 132 may comprise information indicative of the identity of a particular user 116. This information may be used in implementations where the physical access control mechanism 134 is able to identify or otherwise recognize a particular user 116.

The data store 326 may also store user interface data 354. The user interface data 354 may comprise commands, instructions, tags, markup language, images, color values, text, or other data. For example, the user interface data 354 may be expressed as hypertext markup language (HTML), cascading style sheets (CSS), JavaScript, and so forth. One or more output devices 210 are configured to use the user interface data 354 to present the user interface which may be perceived by the user 116. The user interface may include one or more elements including visual, haptic, audible, olfactory, and so forth. For example, the user interface may be a graphical user interface, audible user interface, haptic user interface, or a combination thereof.

The data store 326 may also include other data 356. For example, the other data 356 may include information such as configuration files, social graph information of the user 116, loading dock status, tote 118 availability, and so forth.

The server 204 may also include a power supply 358. The power supply 358 is configured to provide electrical power suitable for operating the components in the server 204.

Figure 4:
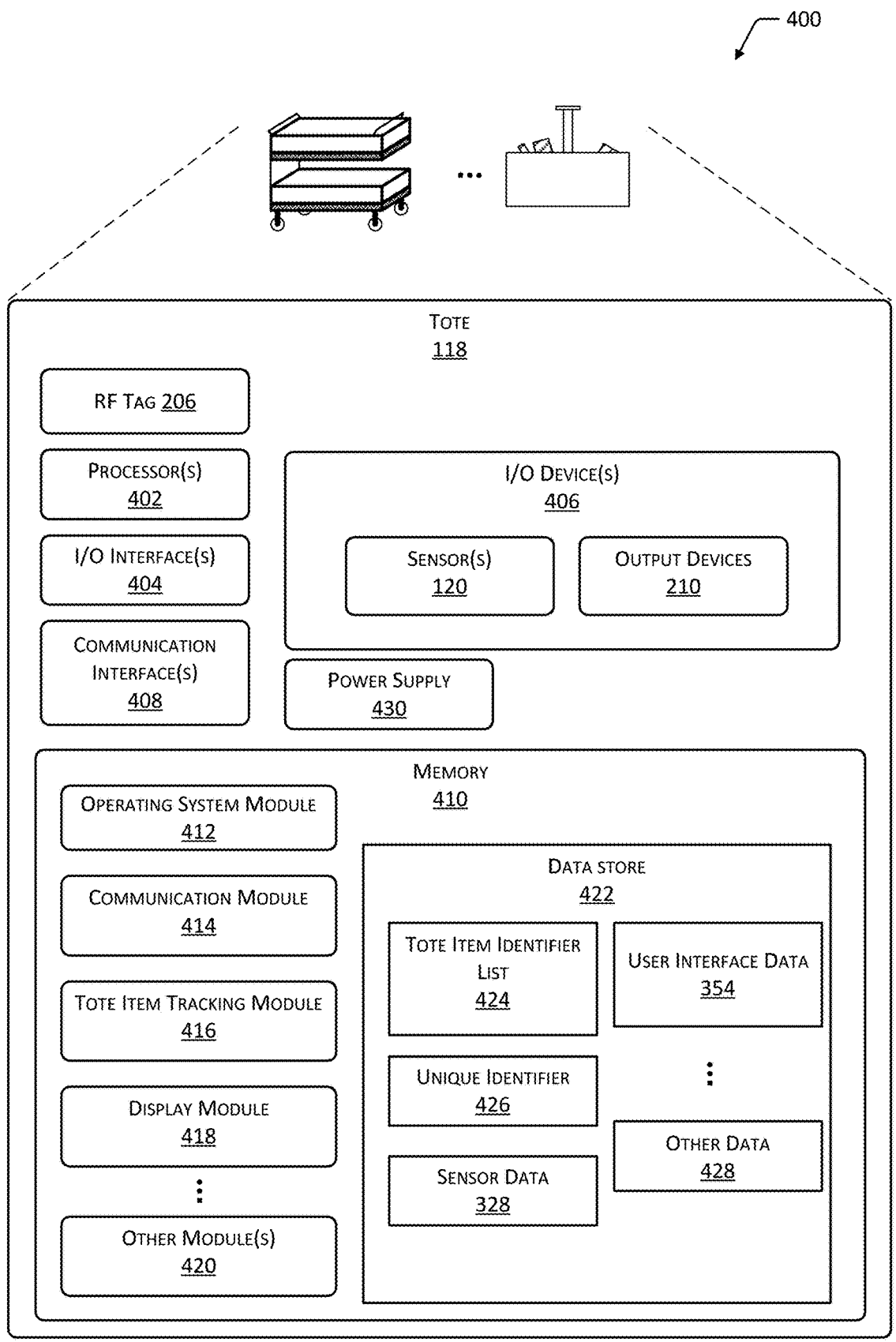
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 210 such as haptic output devices 210(1), audio output devices 210(2), display output devices 210(3), and so forth. For example, the tote 118 may include other output devices 210(T) such as lights which may be activated to provide information to the user 116. In some implementations, input and output devices may be combined. For example, a touchscreen display may incorporate a touch sensor 120(4) and a display output device 210(3). In some embodiments, the I/O devices 406 may be physically incorporated with the tote 118 or may be externally placed.

The tote 118 may also include one or more communication interfaces 408. The communication interfaces 408 may be configured to provide communications between the tote 118 and other devices, such as other totes 118, routers, access points, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, other totes 118, the servers 204, or other devices. The communications may be authenticated, encrypted, and so forth.

The memory 410 may also store a tote item tracking module 416. The tote item tracking module 416 may be configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID or NFC reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface on the display output device 210(3) of the tote 118.

The memory 410 may include a display module 418. The display module 418 may be configured to present information, such as received from the one or more servers 204 or generated onboard the tote 118, using one or more of the output devices 210. For example, the display module 418 may be configured to receive user interface data 354 provided by the user interface module 322. By processing user interface data 354, the user interface may be presented to the user 116 by way of the output devices 210 of the tote 118. For example, the user interface may include haptic output from the haptic output device 210(1), audio output from the audio output devices 210(2), images presented on the display output devices 210(3), activation of lights or other output devices 210(T), or a combination thereof.

Other modules 420 may also be stored within the memory 410. In one implementation, a data handler module may be configured to generate sensor data 328. For example, an imaging sensor 120(1) onboard the tote 118 may acquire image data 328(1) and one or more microphones 120(5) onboard the tote 118 may acquire audio data 328(3). The sensor data 328, or information based thereon, may be provided to the data acquisition module 318.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of the communication interface 408. For example, the unique identifier 426 may comprise a media access control address associated with a Bluetooth interface. In some implementations, the user interface module 322 may use the unique identifier 426 to determine which tote 118 to generate the user interface upon, or to determine a source for the sensor data 328.

The unique identifier 426 may also be used by the access control module 320 to generate access configuration data 132. In some implementations, instead of, or in addition to, tracking the user 116 the inventory management module 316 may generate location data 336 for the tote 118. Based at least in part on the location of the tote 118 in the facility 102 or relative to the user 116, the access configuration data 132 may be generated. For example, the user 116 standing next to the inventory location 114 may be presented with an inventory location 114 which prevents physical access. However, the same user 116 standing next to the same inventory location 114 along with the tote 118 may be presented with the inventory location 114 configured to permit physical access.

The data store 422 may also store sensor data 328. The sensor data 328 may be acquired from the sensors 120 onboard the tote 118. The user interface data 354 received by the tote 118 may also be stored in the data store 422.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
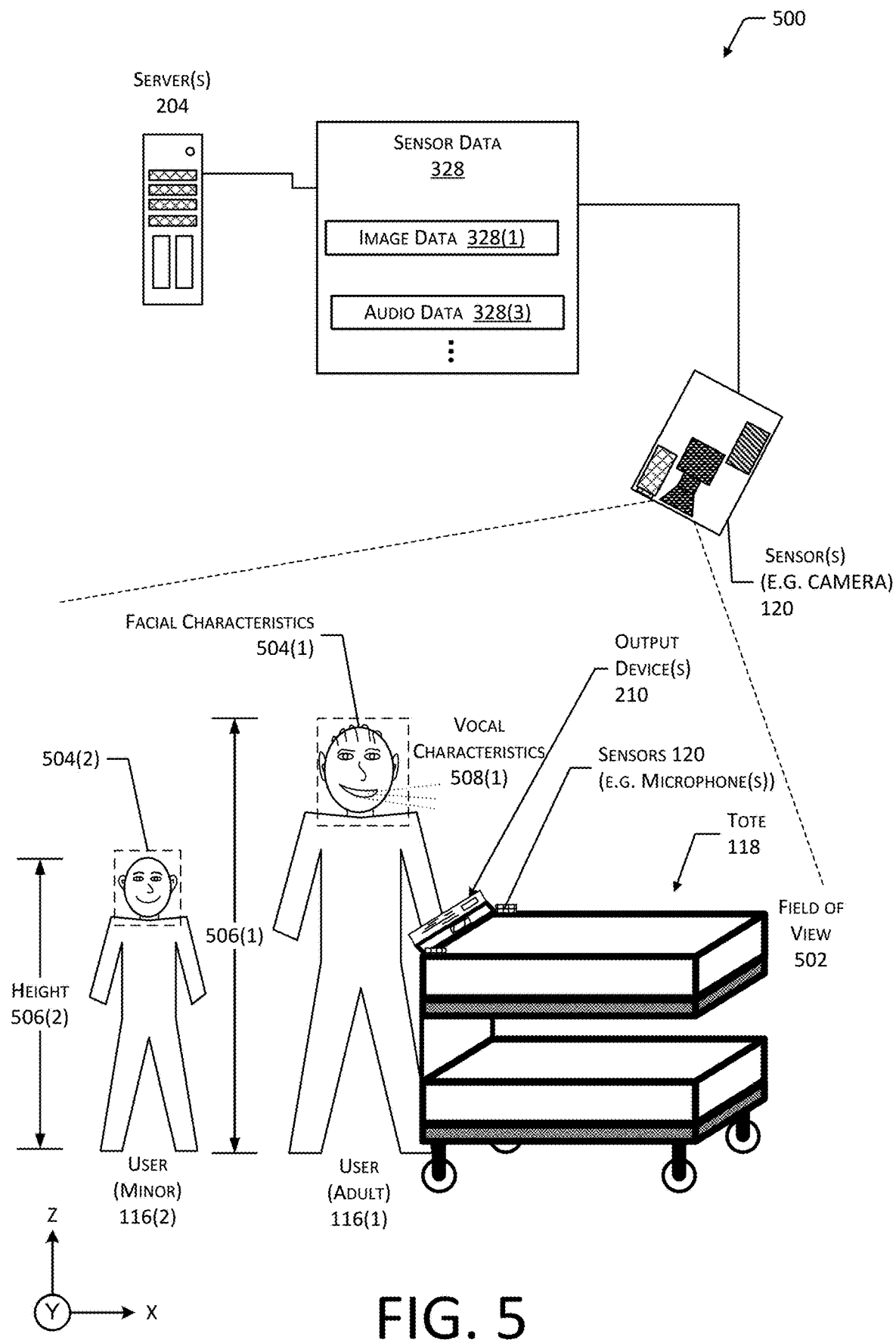
FIG. 5 illustrates an overhead imaging sensor configured to acquire sensor data in the facility, according to some implementations.

FIG. 5 illustrates a side view 500 of an overhead imaging sensor 120(1) acquiring an image of the users 116, the tote 118, and other objects. In some implementations, the facility 102 may include one or more sensors 120 which are configured to acquire data from an overhead vantage point or at other locations within the facility 102. The sensors 120 may include, but are not limited to, one or more of the imaging sensors 120(1), the 3D sensors 120(2), the microphones 120(5), the RFID readers 120(8), the RF receivers 120(9), and so forth. The sensor data 328 acquired by the sensors 120 may be used to generate the user context data 128.

In this illustration, one of the sensors 120 comprises an imaging sensor 120(1) which is configured to generate image data 328(1). A field of view 502 of the imaging sensor 120(1) depicted here includes the users 116(1) and 116(2) and the tote 118. The image data 328(1) may be provided to the inventory management system 122.

In some implementations, the data acquisition module 318 may be configured to generate user context data 128 using information from the plurality of sensors 120. For example, the image data 328(1) may be processed by the inventory management module 316 to determine at least a portion of the user context data 128, such as the location data 336 for the users 116(1) and 116(2), approximate age of the user 116, and so forth.

As described above, the tote 118 may also include one or more output devices 210, one or more sensors 120, and so forth. The data acquisition module 318 may be configured to access the data provided by these sensors 120 while the user interface module 322 may be configured to generate user interface data 354 configured to provide the user interface by way of the output devices 210. The user interface may be used to acquire information from the user 116 such as a delegation or rescission of access permissions 352 to another user 116. For example, the first user 116(1) may access the user interface as presented on the output device 210 of the tote 118 and indicate the second user 116(2) is delegated the access permissions 352 associated with the first user 116(1).

As described above, the imaging sensors 120(1) may acquire image data 328(1). The image data 328(1) may be processed to generate user context data 128 such as demographic data 344 about the user 116. The demographic data 344 may include one or more facial characteristics 504 of the user 116, height 506 of the user 116, vocal characteristics 508 of the user 116, and so forth. The facial characteristics 504 may be indicative of relative placement of different fiducials on the face of the user 116 depicted in the image data 328(1). The fiducials may include, but are not limited to, particular facial features of the user, points on those features, ornamentation (such as earrings), accessories (such as glasses), and so forth. The facial characteristics 504 may include face shape, ratio of face height to face width, ratio of interpupillary distance to face height or width, and so forth. The facial characteristics 504 may be analyzed to determine an estimated age of the user 116 depicted in the image data 328(1). For example, the facial characteristics 504 may be analyzed using one or more classifiers which have been previously trained to associate particular ages with those facial characteristics 504. These may include cascade classifiers, support vector machines, and so forth.

In some implementations facial characteristics 504 may be expressed as eigenvectors by using principal component analysis (PCA) on a set of images. These eigenvectors as descriptive of a human face may be known as "eigenfaces" or "eigenimages". Characteristics of these eigenvectors may be performed to correlate the facial characteristics 504 with an estimated age.

The image processing described in this disclosure may be performed at least in part using one or more of the following tools or techniques for pre-processing, identification, age estimation, and so forth. The OpenCV library as developed by Intel Corporation of Santa Clara, Calif., Willow Garage of Menlo Park, Calif., and Itseez of Nizhny Novgorod, Russia, with information available at www.opencv.org may be used. The EyeFace SKDK as promulgated by Eyedea Recognition Ltd. of Prague, Czech Republic. The OpenBR library and tools as originated by MITRE Corporation of Bedford, Mass. and McLean, Va. and promulgated by the OpenBR group at openbiometrics.org may also be used in some implementations for image processing, age estimation, and so forth. Other techniques for age estimation may be used, such as those described by Guodong Guo, PhD of West Virginia University.

The height 506 of the user 116 may be determined using stereovision techniques, stadiametric techniques, and so forth. In other implementations, the image data 328(1) may be processed to determine other attributes about the user 116 such as body shape, limb proportions, and so forth. These other attributes may be used to generate user context data 128 such as determining an age of the user 116, identifying the user 116, and so forth.

The vocal characteristics 508 may comprise information about the sounds uttered by the user 116, such as speech sounds, laughter, sighs, grunts, and so forth. The vocal characteristics 508 may include information about frequency such as pitch or timbre, cadence, and so forth. This information may be used to determine an approximate age, minimum age, maximum age, age range, and so forth, of the user 116. For example, voices exhibiting particular higher-frequency components may be associated with adolescent users 116, while voices exhibiting lower-frequency components may be associated with adult users 116. In other implementations, the meaning of words spoken by the user 116 may also be analyzed and considered. Particular words or word groups may be associated with particular age groups. For example, "wow" may be associated with users 116 between the ages of 3 and 15 years.

Figure 6:
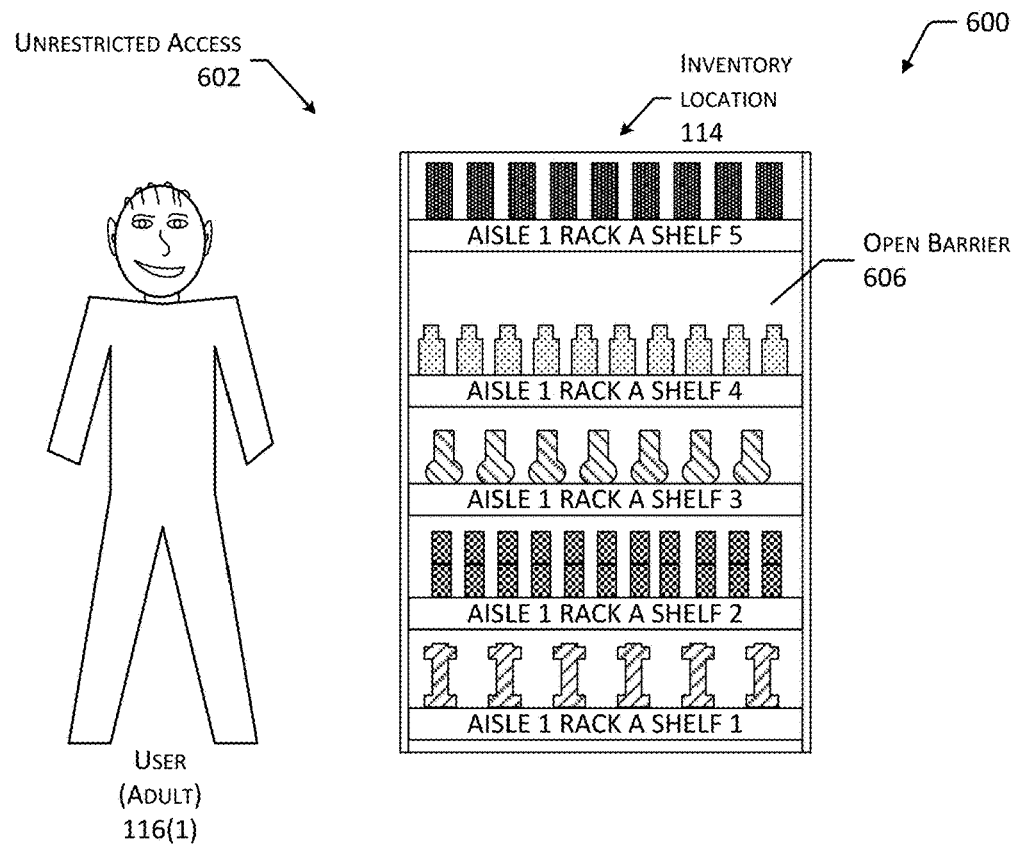
FIG. 6 illustrates operation of a physical access control mechanism, according to some implementations.
Figure 6:
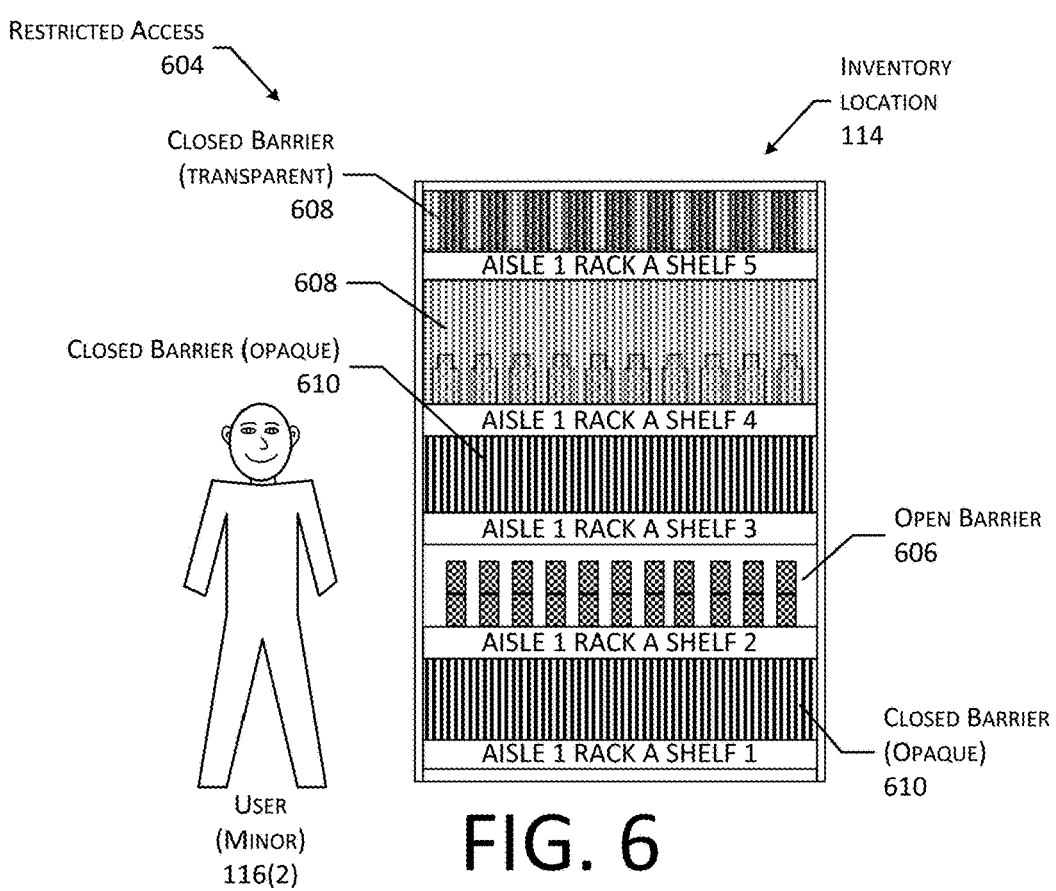

FIG. 6 illustrates operation 600 of the physical access control mechanisms 134, according to some implementations. In this illustration two scenarios are depicted, an unrestricted access scenario 602 and a restricted access scenario 604. By way of illustration and not necessarily as a limitation, in this figure the user 116(1) is an adult who has access permissions 352 allowing unrestricted access to all items 104, inventory locations 114, or both. Additionally, for purposes of illustration, the user 116(2) is a minor who has access permissions 352 which selectively define physical access to one or more particular items 104, inventory locations 114, or both.

In the unrestricted access scenario 602, the access control module 320 has processed the user context data 128 and generated access configuration data 132 indicative of grant of access. As the user 116(1) approaches the inventory location 114 depicted here, the one or more physical access control mechanisms 134 are configured to permit physical access to the inventory locations 114 and the items 104 stored therein. For example, inventory locations 114 depicted here may use movable barriers 134(1) to control physical access. Responsive to the access configuration data 132, the movable barriers 134(1) may be set to provide an open barrier 606 as depicted here. In the open barrier 606 state, the user 116 may handle the items 104 at the different inventory locations 114.

In some implementations, the transition of the inventory location 114 between physical access states such as open or closed may be based at least in part on the actions of the user 116. For example, the access control module 320 may be configured to open the movable barriers 134(1) as the user 116 performs the action of reaching for the item 104 protected thereby. In another example, the access control module 320 may be configured to open and close the movable barriers 134(1) based at least in part on the gaze direction data 340 or body orientation data. In this example, inventory locations 114 which the user 116 looks at for a threshold minimum amount of time may transition to the open barrier 606 state, while those inventory locations 114 which are not being looked at remain or are transitioned to a closed barrier state.

In comparison, in the restricted access scenario 604, the access control module 320 has processed the user context data 128 and generated access configuration data 132 which is indicative of a selective grant of physical access to certain inventory locations 114 and denial of access to other inventory locations 114. For example, the access configuration data 132 is configured to deny access to the inventory locations 114 of aisle 1 rack A shelf 5, shelf 4, shelf 3, and shelf 1 while permitting access to the inventory location 114 of shelf 2 by way of an open barrier 606. Continuing the example, the minor user 116(2) may be allowed to interact with the items 104 which are stowed on shelf 2 because they are below a threshold level of price, fragility, and so forth. In other implementations, physical access may be granted based at least in part on a recommendation of a particular item 104 to the particular user 116. For example, a recommendation for the toy "Truckasaurus" may result in the inventory location 114 containing that item 104 being made accessible.

As described above with regard to FIG. 2, in some implementations physical access control mechanisms 134 may comprise materials which are opaque or transparent. For example, the movable barrier 134(1) may be transparent, allowing the user 116 to view items 104 which are protected by the movable barrier 134(1). In some implementations, the materials may be configured to dynamically vary their opacity or transparency. For example, an electrochromic material may transition between an opaque and a transparent state upon application of voltage. As illustrated here, shelves 4 and 5 have transparent closed barriers 608, while shelves 1 and 3 have opaque closed barriers 610.

As discussed above, in some implementations one user 116 may delegate access permissions 352 to another user 116. For example, the adult user 116(1) depicted here may verbally ask the minor user 116(2) to get a particular item 104. The adult user's 116(1) speech may be recognized by way of speech recognition techniques and the resulting request may be processed by the access control module 320 to generate access configuration data 132 which allows the minor user 116(2) delegated access permissions 352 to get the item 104. In other implementations, the delegation may be such that while the minor user 116(2) is within a threshold distance of the adult user 116(1) access permissions 352 are delegated.

Figure 7:
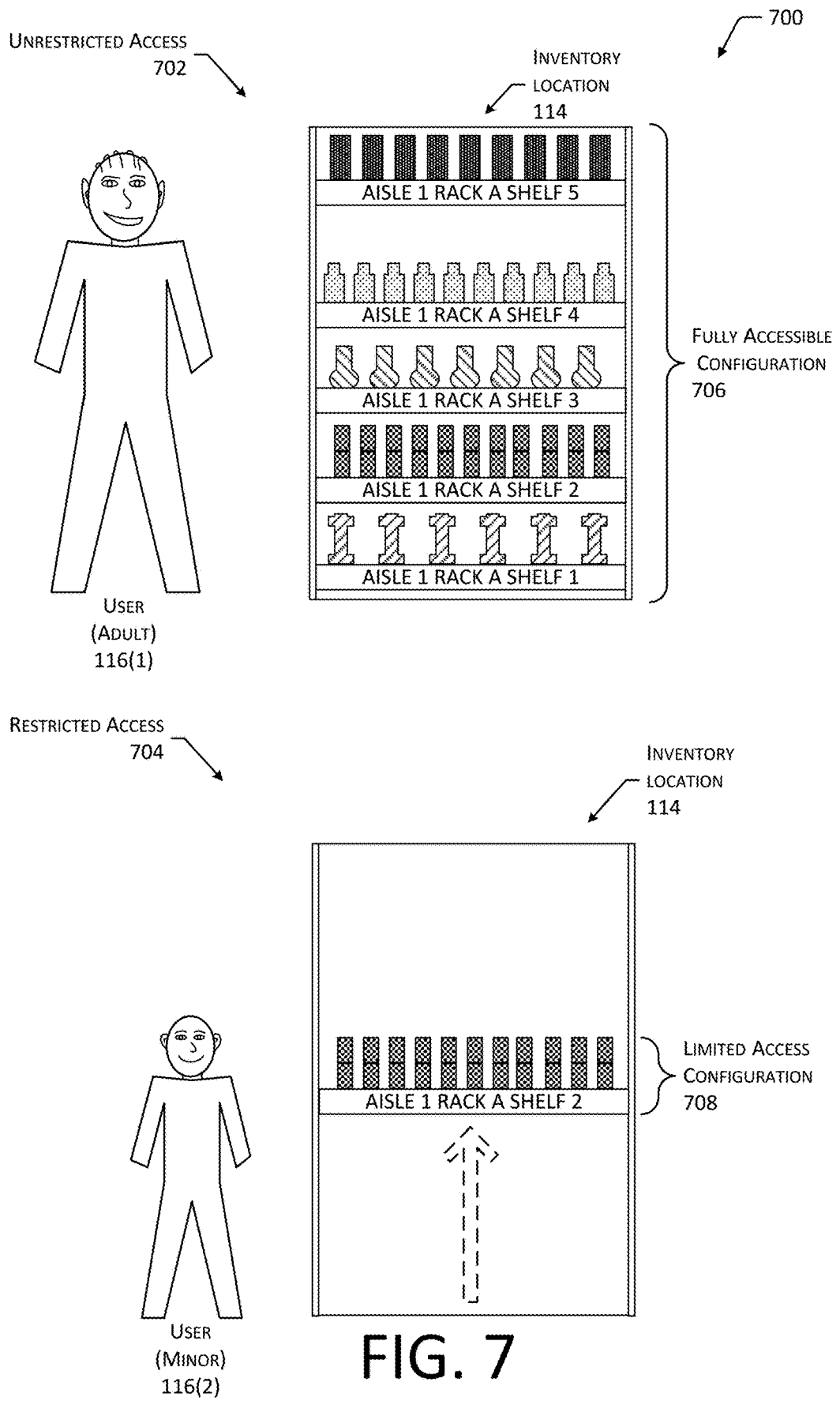
FIG. 7 illustrates operation of another physical access control mechanism, according to some implementations.

FIG. 7 illustrates operation 700 of another physical access control mechanism 134, according to some implementations. Similar to FIG. 6 above, in this illustration two scenarios are depicted, an unrestricted access 702 scenario and a restricted access 704 scenario, with the user 116(1) being an adult, and the user 116(2) being a minor. In this illustration, the inventory locations 114 use the movable inventory location 134(2) to control physical access.

In the unrestricted access 702 scenario, the inventory locations 114 comprising the shelves on the rack have been moved into a fully accessible configuration 706 such that the user 116(1) has unrestricted physical access to all the inventory locations 114 comprising shelves 1-5. In comparison, in the restricted access 704 scenario, the shelves have been relocated into a limited access configuration 708. In the limited access configuration 708, shelf 2 has been relocated to a height above the floor which may be more comfortable for the user 116(2), while the remaining shelves 1, 3, 4, and 5 have been moved beyond the reach of the user 116(2). For example, the shelves 1, 3, 4, and 5 may have been moved to a greater height above the floor, down below the level of the floor, or may have been moved into a storage area or other inaccessible location, such as a volume behind the rack. The movable inventory location 134(2) may comprise a carousel or other mechanism configured to physically relocate an inventory location 114 such as a shelf, rack, bin, and so forth.

Illustrative Processes

Figure 8:
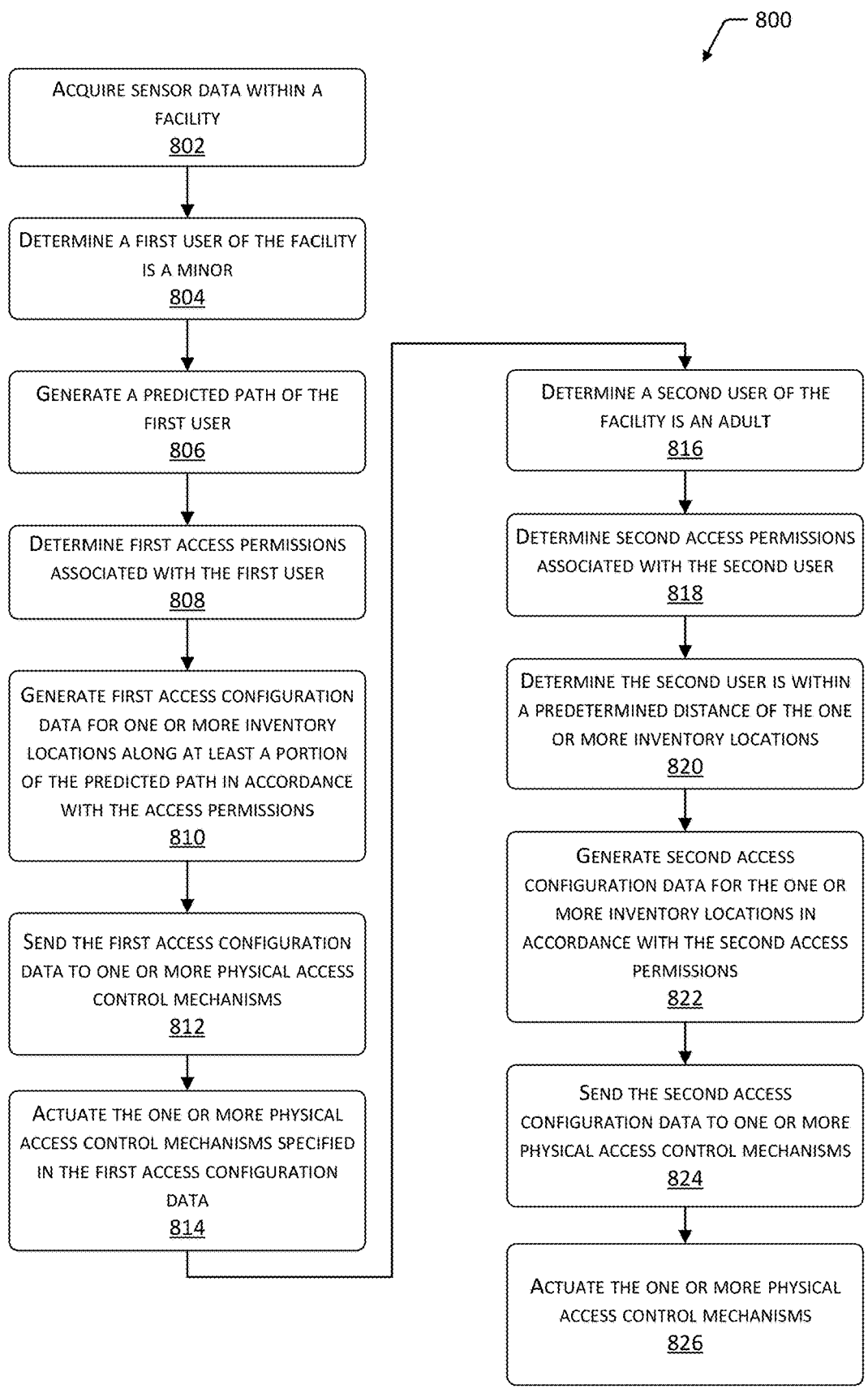
FIG. 8 depicts a flow diagram of a process for controlling physical access to items in the facility, according to some implementations.

FIG. 8 depicts a flow diagram 800 of a process for controlling physical access to items in the facility 102, according to some implementations. In some implementations, the process may be performed at least in part by the inventory management module 316.

Block 802 acquires sensor data 328 from the one or more sensors 120 associated with the facility 102. For example, the imaging sensors 120(1) may generate image data 328(1).

As described above, in some implementations the inventory management module 316 may generate data such as user context data 128 based on the sensor data 328. In one implementation, data about users 116 may be generated. For example, facial characteristics 504, height 506, weight of the user 116, and so forth may be generated. This data may be used to determine the age of the first user 116(2) based on the facial characteristics 504, height 506, weight, and so forth.

Block 804 determines the first user 116(2) of the facility 102 is a minor. In one implementation, the determination of the age may be based on identification of the first user 116(2) and retrieval of the age or date of birth information which has been previously stored. In another implementation, the determination of the age may be based on processing the image data 328(1), such as by analyzing one or more of the facial characteristics 504 and generating an estimated age. In still another implementation, instead of, or in conjunction with the height or other data about the user 116, vocal characteristics 508 may be used to determine the estimated age. For example, a voice having predominately low-frequency components may be determined to be an adult. The determination that the first user 116(2) is a minor may involve a comparison of the age (as determined by the techniques described herein) with one or more threshold values. For example, the threshold value may specify that a minor is anyone under the age of 18. The threshold values may be specified by the operator of the facility 102, by another user 116 such as an adult who is responsible for the minor, and so forth.

Block 806 generates a predicted path 130 of the first user 116(2). As described above, the predicted path 130 is an estimation of which route through the facility 102 the first user 116(2) may take.

Block 808 determines first access permissions 352(1) associated with the first user 116(2). As described above, the first access permissions 352(1) may indicate a level of physical access to which the first user 116(2) is entitled. For example, the first access permissions 352(1) may indicate that the inventory location 114(8) is designated as inaccessible to the first user 116(2) and thus physical access is to be prevented.

Block 810 generates first access configuration data 132(1) for one or more of the inventory locations 114 along at least a portion of the predicted path 130 in accordance with the first access permissions 352(1). Continuing the example above, the first access configuration data 132(1) indicates the inventory location 114(8) which is to be made inaccessible to physical access by the first user 116(2).

Block 812 sends the first access configuration data 132(1) to the physical access control mechanism(s) 134. For example, the first access configuration data 132(1) may be routed to the physical access control mechanism 134 for a particular inventory location 114.

Block 814 actuates one or more physical access control mechanisms 134 as specified in the first access configuration data 132(1). For example, the access control module 320 may send the first access configuration data 132(1) to the physical access control mechanism 134 associated with the inventory location 114(8). Responsive to this, the physical access control mechanism 134 may initiate one or more actions which are configured to prevent physical access to the inventory location 114(8) by the first user 116(2). For example, the physical access control mechanism 134 may close a movable barrier 134(1), change one or more of a physical location, position, or orientation of a movable inventory location 134(2), lock a lockable hanger 134(3), lock a dispenser 134(5), and so forth.

Block 816 determines, with the acquired images, a second user 116(1) of the facility is an adult with an age greater than or equal to the age threshold. As described above, the age of the second user 116(1) may be based on identifying the user 116(1) and retrieving age data, by processing the image data 328(1) to estimate an age, and so forth.

Block 818 determines second access permissions 352(2) associated with the second user 116(1). For example, the second access permissions 352(2) may indicate that the inventory location 114 is designated as accessible to the second user 116(1).

Block 820 determines the second user 116(1) is within a predetermined distance of the inventory location 114. For example, the second user 116(1) may be within 1 m of the inventory location 114.

Block 822 generates second access configuration data 132(2) for the inventory location 114. For example, the second access configuration data 132(2) may designate the inventory location 114 as accessible in accordance with the second access permissions 352(2).

Block 824 sends the second access configuration data 132(2) to the physical access control mechanism 134. For example, the second access configuration data 132(2) may be routed to the physical access control mechanism 134 for a particular inventory location 114.

Block 826 actuates the physical access control mechanism 134 to allow physical access to the item 104 stored at the inventory location 114. For example, the movable barrier 134(1) may be opened and the second user 116(1) may pick up the item 104. In some implementations, the user 116 may activate a control, such as a touchscreen control or a button 120(3) to confirm opening of the inventory location 114. Continuing the example, the moveable barrier 134(1) may be opened after the second user 116(1) presses a button 120(3).

Figure 9:
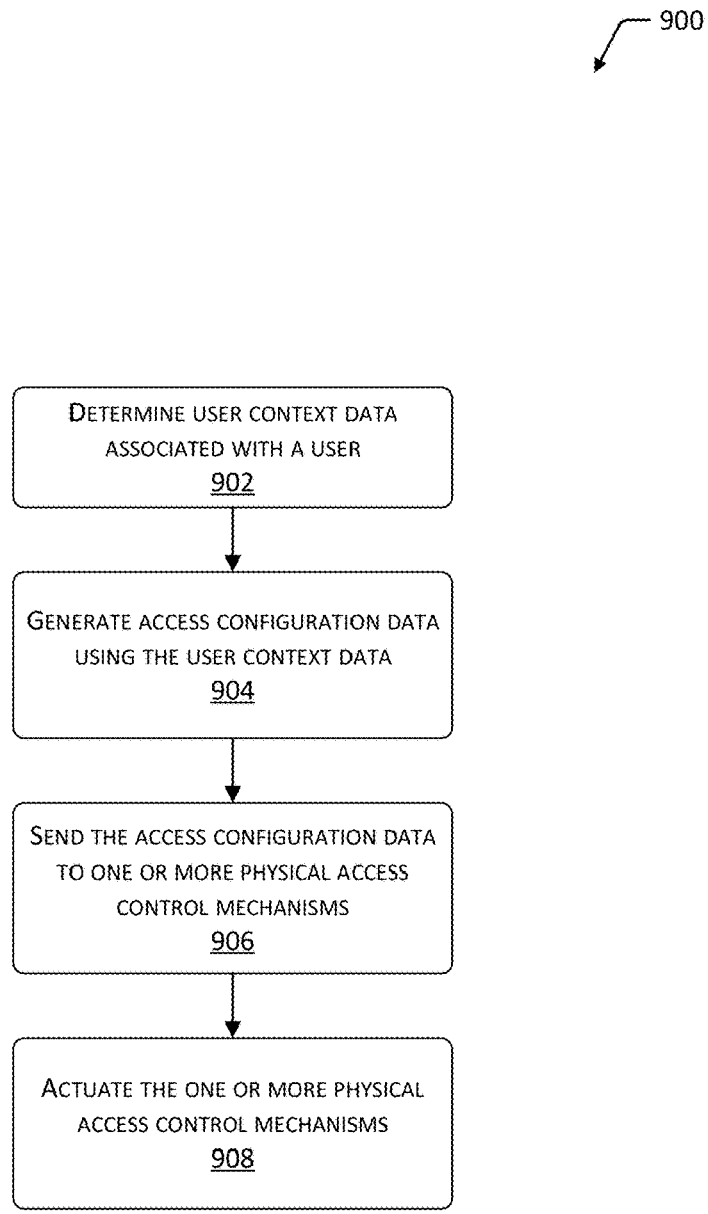
FIG. 9 depicts a flow diagram of another process for controlling physical access to items in the facility, according to some implementations.

FIG. 9 depicts a flow diagram 900 of another process for controlling physical access to items 104 in the facility 102, according to some implementations. In some implementations, the process may be performed at least in part by the inventory management module 316.

Block 902 determines first user context data 128(1) associated with a first user 116(4) of the facility 102. As described above, the user context data 128 may include one or more of the following: a threshold age associated with one or more items 104 in the one or more inventory locations 114, an age of the first user 116(4), proximity of the first user 116(4) to a second user 116(5), relationship between the first user 116(4) and the second user 116(5), historical activity of the first user 116(4), a predicted path 130 of the first user 116(4) in the facility 102, a cost or other value of one or more items 104 stored at particular ones of the inventory locations 114, location of the first user 116(4) within the facility 102, and so forth. For example, the threshold age associated with one or more items 104 may designate that items 104 with particular ingredients, such as pharmaceuticals, alcohol, tobacco, and so forth, are restricted to users 116 over the age of 21. In another example, the fragility of the item 104 may be considered, such that physical access to highly delicate and breakable items 104 may be more restricted than physical access to more robust and sturdy items 104. In yet another example, the proximity of the first user 116(4) to the second user 116(5) may indicate how close in space the two are to one another, such as in meters.

The user context data 128 may include the age of the user 116. As described above, the age of the user 116 may be retrieved from memory where such information has been previously stored, or may be determined based at least in part by processing sensor data 328. For example, the image data 328(1) including an image of the first user 116(4) may be processed to determine the facial characteristics 504 of the first user 116(4), the height 506 of the first user 116(4), and so forth. Based at least in part on this data, and age of the first user 116(4) may be calculated. In some implementations, the age estimation may be made using one or more other pieces of data, such as weight, type of apparel worn, hair color, and so forth.

The user context data 128 may include the item interaction data 350. As described above, the item interaction data 350 may provide information indicative of the handling by the first user 116(4) of one or more items 104 at the one or more inventory locations 114 exceeding a handling threshold. For example, the handling threshold may specify a maximum number of items 104, such as twenty, which may be handled within a predetermined time period, such as five minutes. Continuing the example, the user 116 which travels through the facility 102 quickly picking up and setting down items 104 may exceed the handling threshold and thus may be denied physical access to some or all of the items 104 in the facility 102.

The item data 332 indicative of a cost of one or more items 104 stored at the one or more inventory locations 114 exceeding a cost threshold may also be included in the user context data 128. For example, the cost may reflect a retail price, wholesale price, replacement cost, and so forth which are associated with the item 104. In one implementation, items 104 which exceed the cost threshold may have physical access restricted to users 116 which are below a threshold age. In this implementation, the minor user 116(2) is denied physical access to these items 104, while physical access may be allowed to adult users 116(1).

The user context data 128 may include information indicative of an action by the first user 116(4), such as reaching towards or otherwise attempting to handle an item 104 stowed by one or more of the inventory locations 114. Other actions may include pointing or gesturing towards the inventory location 114 or item 104, moving towards the inventory location or item 104, and so forth. Based at least in part on this action, the access control module 320 may be configured to generate access configuration data 132 which allows the first user 116(1) physical access to the item 104. In comparison, the second user 116(2) who is a minor may be denied physical access.

Block 904 generates access configuration data 132 for one or more inventory locations 114 within the facility 102. The access configuration data 132 may be based at least in part on the first user context data 128(1). As described above, the access configuration data 132 is indicative of a level of physical access control to be applied to the one or more inventory locations 114.

In one scenario, the relationship data 346 may indicate that the second user 116(2) who is a minor is affiliated with the first user 116(1) who is an adult. For example, the relationship data 346 may indicate that the two are siblings, child and parent, child and guardian, and so forth. In this scenario, the access configuration data 132 may be configured to allow the second user 116(2) physical access to the items 104.

In another scenario, the relationship data 346 may indicate that the second user 116(2) who is a minor is unaffiliated with the first user 116(1) who is an adult. In this scenario, the access configuration data 132 may be configured to deny the second user 116(2) physical access to the items 104. This may prevent an unaccompanied minor from gaining physical access by being close to an unrelated adult.

As described above, the user context data 128 may include the predicted path 130 indicative of one or more possible routes of the user 116 within the facility 102. The access configuration data 132 may be configured to actuate the one or more physical access control mechanisms 134 based on the location data 336 (such as a present location of the user 116 within the facility 102) and the predicted path 130. For example, the access configuration data 132 to transition the physical access control mechanism 134 for an inventory location 114 may be provided when the user 116 is determined to be within a threshold distance such as 2 meters or an estimated time of arrival of five seconds by the user 116 at the inventory location 114.

Block 906 sends the access configuration data 132 to one or more of the physical access control mechanisms 134. The access configuration data 132 may specify one or more particular physical access control mechanisms 134 of one or more particular inventory locations 114. For example, the access configuration data 132 may be addressed to a group of physical access control mechanisms 134 which control access to a rack of inventory locations 114.

Block 908 actuates one or more physical access control mechanisms 134 associated with the one or more inventory locations 114 specified in the access configuration data 132. The actuation controls physical access by the user 116 to items 104 stowed by the one or more inventory locations 114. For example, the actuation may transition the movable barrier 134(1) to a closed barrier state, such as shown at 608 and 610 above. The level of physical access control applied to the one or more inventory locations 114 is configured to allow, deny, restrict, or otherwise control the physical access to the items 104 stowed at those inventory locations 114 by the user 116.

Figure 10:
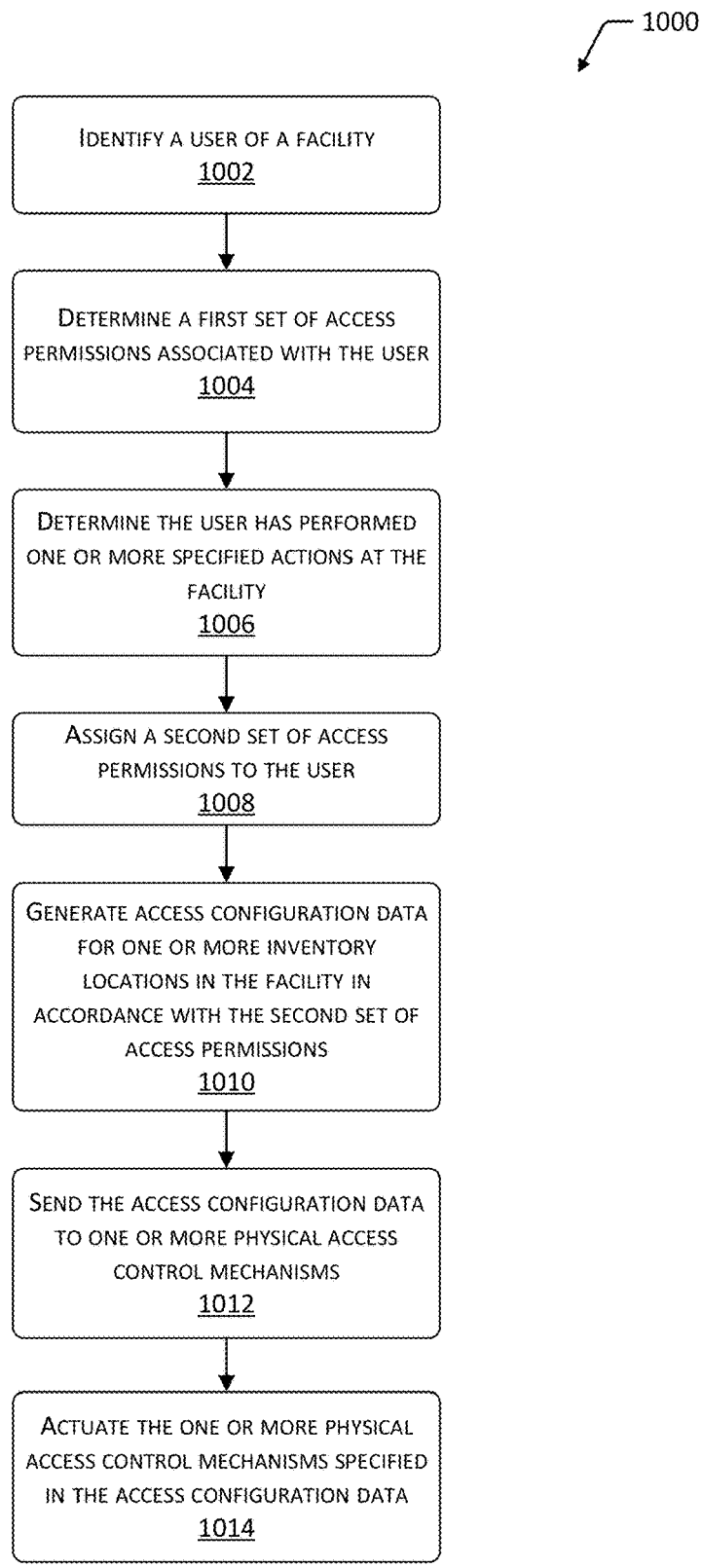
FIG. 10 depicts a flow diagram of a process for modifying physical access based on user actions in the facility, according to some implementations.

FIG. 10 depicts a flow diagram 1000 of a process for modifying physical access based on user actions in the facility 102, according to some implementations. In some implementations, the process may be performed at least in part by the inventory management module 316.

Block 1002 identifies the user 116 of the facility 102. In one implementation, the identification may use the image data 328(1). For example, the image data 328(1) may be processed using one or more techniques to determine identity of the user 116. These techniques may include one or more of facial recognition, clothing recognition, gait recognition, and so forth. For example, facial characteristics 504 such as shape of the external ear or a ratio of a distance between eyes and a distance from mouth to nose may be used to identify the user 116. In other implementations, other techniques may be used instead of or in addition to identification by way of the image data 328(1). For example, the user 116 may be identified by way of an RFID tag, manual entry of credentials at an input device, and so forth.

Block 1004 determines a first set of access permissions 352(1) associated with the user 116. For example, the access permissions 352 associated with the user identity may be retrieved from the data store 326.

Block 1006 determines the user 116 is performing one or more specified actions at the facility 102. For example, these actions may include handling an item 104, damaging an item 104, misplacing an item 104 into an incorrect inventory location 114, exceeding a handling threshold such as a number of items 104 handled per unit of time, and so forth. In another example, actions may include placing an item 104 into a correct inventory location 114, returning the item 104 to the inventory location 114 in an acceptable fashion such as neatly arranged, and so forth.

Block 1008 assigns a second set of access permissions 352(2) to the user 116. For example, the record of the user account may be updated such that the second set of access permissions 352(2) may add or remove access privileges.

Block 1010 generates access configuration data 132 for one or more inventory locations 114 in the facility 102 in accordance with the second set of access permissions 352 (2).

Block 1012 sends the access configuration data 132 to the one or more physical access control mechanisms 134. For example, the access configuration data 132 may comprise information indicative of particular physical access control mechanisms 134, such as a mechanism identifier, and may broadcast the access configuration data 132 across a network.

Block 1014 actuates one or more of the physical access control mechanisms 134 as specified in the access configuration data 132. Continuing the examples above, as the user 116 moves through the facility 102 physical access to items is allowed or restricted.

In one implementation, the first set of access permissions 352(1) may provide the user 116 with full access to all items 104 in the facility 102. However, subsequent to poor behaviors such as breaking items 104 or otherwise disturbing the orderly function of the facility 102, the user 116 may find themselves with the second set of access permissions 352(2) which may impose limits designed to prevent future poor behaviors or reduce the damage from those future poor behaviors. By using this technique, the user 116 may minimize liability for damaged items 104, while the facility operator is able to minimize disruption of the facility 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    acquiring an image of a first user with an imaging sensor;
    determining first data associated with the first user of a facility, wherein the first data indicates one or more first permissions associated with the first user accessing one or more portions of an inventory location within the facility;
    accessing second data indicative of one or more predicted paths of the first user within the facility, wherein the one or more predicted paths are based on one or more of previous movements of at least a second user or a presence of the at least the second user within the facility;
    generating third data for the inventory location using the first data and the second data, wherein the third data is indicative of at least one portion of the one or more portions of the inventory location and a level of access control to be applied to the at least one portion of the one or more portions of the inventory location; and
    sending the third data to one or more access control mechanisms associated with the inventory location to control access, by the first user, to the one or more portions of the inventory location.

2. The method of claim 1, wherein:
    the first data is indicative of one or more of:
        an age of the first user,
        a threshold age associated with one or more items at the one or more portions of the inventory location,
        a distance between the first user and a third user,
        a relationship between the first user and the third user,
        a cost of the one or more items,
        historical activity associated with the first user, or
        interaction data indicative of one or more interactions between the first user and the one or more items.

3. The method of claim 1, wherein:
    the one or more first permissions are based on one or more of:
        an identity of the first user,
        an age of the first user,
        a threshold age associated with one or more items at the one or more portions of the inventory location,
        a cost associated with the one or more items,
        a history of interactions between the first user and the one or more items,
        a relationship between the first user and a third user, or
        a delegation or removal of permissions to the first user.

4. The method of claim 1, wherein the one or more first permissions specify one or more of:
   unrestricted access to the one or more portions of the inventory location, or
   restricted access to at least one of the one or more portions of the inventory location.

5. The method of claim 1, further comprising:
   actuating at least one of the one or more access control mechanisms based on the third data, responsive to a present location of the first user within the facility; and
   wherein the one or more predicted paths of the first user include the inventory location.

6. The method of claim 1, wherein the one or more first permissions are indicative of the first user being restricted from accessing at least one of the one or more portions of the inventory location; and
   the method further comprising:
      detecting a third user within the facility;
      determining fourth data indicative of one or more second permissions associated with the third user, wherein the one or more second permissions are indicative of the third user being allowed access to the one or more portions of the inventory location;
      determining the third user is related to the first user;
      determining the third user is within a predetermined distance of the inventory location; and
      generating fifth data for the inventory location, wherein the fifth data indicates the one or more portions of the inventory location are accessible to the first user.

7. The method of claim 1, wherein:
   the one or more predicted paths of the first user are further based on one or more of:
      an identity of the first user,
      items acquired by the first user during previous visits to the facility,
      a physical layout of the facility,
      a current location of the first user,
      a current direction of motion of the first user, or
      previous movements of the first user.

8. A system comprising:
   one or more sensors to acquire first data;
   an inventory location comprising one or more access control mechanisms;
   a memory, storing computer-executable instructions; and
   a hardware processor in communication with the one or more sensors, the one or more access control mechanisms, and the memory, wherein the hardware processor executes the computer-executable instructions to:
      detect a first user at an entry area of a facility or an aisle of the facility based on the first data;
      generate second data associated with the first user when the first user is detected at the entry area of the facility or the aisle of the facility;
      determine, using the second data, third data indicative of one or more first permissions associated with the first user accessing one or more portions of the inventory location;
      generate fourth data for the one or more portions of the inventory location; and
      send the fourth data to the one or more access control mechanisms of the inventory location to prevent or allow access to the one or more portions of the inventory location.

9. The system of claim 8, wherein:
   the fourth data comprises:
      first configuration data indicative of the first user being restricted access to a first portion of the inventory location; and
      second configuration data indicative of the first user being allowed access to a second portion of the inventory location; and
   the hardware processor to further execute the computer-executable instructions to:
      actuate a first access control mechanism of the one or more access control mechanisms, based on the first configuration data, to prevent access to the first portion of the inventory location; and
      actuate a second access control mechanism of the one or more access control mechanisms, based on the second configuration data, to allow access to the second portion of the inventory location.

10. The system of claim 8, wherein the one or more first permissions indicate restricted access to at least one of the one or more portions of the inventory location to the first user; and the hardware processor to further execute the computer-executable instructions to:
    determine the first user is within a threshold distance of the inventory location; and
    actuate the one or more access control mechanisms to prevent access to the at least one of the one or more portions of the inventory location, responsive to the first user being within the threshold distance of the inventory location.

11. The system of claim 8, wherein:
    the second data is indicative of one or more of:
       an age of the first user,
       a threshold age associated with one or more items at the one or more portions of the inventory location,
       a distance between the first user and a second user,
       a relationship between the first user and the second user,
       a cost associated with the one or more items,
       historical activity associated with the first user,
       interaction data indicative of one or more interactions between the first user and the one or more items, or
       a predicted path of the first user in the facility.

12. The system of claim 8, the hardware processor to further execute the computer-executable instructions to:
    generate a predicted path of the first user;
    wherein the predicted path of the first user includes the inventory location; and
    wherein the predicted path of the first user is determined based on one or more of:
       an identity of the first user,
       items acquired by the first user during previous visits to the facility,
       a physical layout of the facility,
       a current location of the first user,
       a current direction of motion of the first user,
       previous movements of the first user, or
       movements of other users within the facility.

13. The system of claim 8, wherein:
    the one or more sensors include an imaging sensor;
    the first data comprises an image of the first user; and
    the hardware processor to further execute the computer-executable instructions to:
       process the image of the first user to determine one or more:
          an age of the first user,
          a location of the first user in the facility, or an interaction between the first user and one or more items at the one or more portions of the inventory location; and include information about the age, the location, or the interaction in the second data.

14. The system of claim 8, wherein the one or more access control mechanisms include one or more of:
a moveable barrier,
a moveable inventory location,
a lockable hanger,
a tether,
a dispenser, or
a gate.

15. A system comprising:
one or more sensors to generate first data;
an inventory location comprising one or more access control mechanisms;
a memory, storing computer-executable instructions; and
a hardware processor in communication with the one or more sensors, the one or more access control mechanisms, and the memory, wherein the hardware processor executes the computer-executable instructions to:
identify a first user based on the first data;
determine second data associated with the first user, the second data indicative of one or more first permissions associated with the first user accessing one or more portions of the inventory location;
determine the first user has performed one or more actions at a facility, the one or more actions comprising one or more of:
the first user damaging one or more items at the one or more portions of the inventory location, or
the first user misplacing the one or more items in an incorrect inventory location;
determine third data associated with the first user based on the first user performing the one or more actions, the third data indicative of one or more second permissions associated with the first user accessing the one or more portions of the inventory location;
generate fourth data for the one or more portions of the inventory location based on the third data; and
send the fourth data to the one or more access control mechanisms to prevent or allow access to the one or more portions of the inventory location.

16. The system of claim 15, wherein:
the one or more first permissions are based on one or more of:
an identity of the first user,
an age of the first user,
a threshold age associated with the one or more items at the one or more portions of the inventory location,
a location of the first user,
an orientation of the first user,
a position of the first user,
a distance between the first user and a second user,
a relationship between the first user and the second user,
a cost of the one or more items,
historical activity associated with the first user,
interaction data indicative of one or more interactions between the first user and the one or more items, or
a delegation or removal of permissions to the first user.

17. The system of claim 15, wherein the one or more first permissions associated with the first user are different from the one or more second permissions associated with the first user.

18. The system of claim 15, wherein:
the first data comprises one or more images inclusive of the first user; and
the identification of the first user is based on one or more of:
facial recognition,
clothing recognition, or
gait recognition.

19. The system of claim 15, wherein:
the one or more first permissions allow the first user full access to the one or more portions of the inventory location;
the one or more second permissions restrict access by the first user to at least one of the one or more portions of the inventory location; and
the hardware processor to further execute the computer-executable instructions to:
actuate the one or more access control mechanisms to restrict access to the at least one of the one or more portions of the inventory location.

20. The system of claim 15, wherein:
the second data further comprises information regarding a predicted path for the first user within the facility;
the inventory location is located along the predicted path; and
the one or more first permissions are based on the inventory location being located along the predicted path.

* * * * *